(12) United States Patent
Guo et al.

(10) Patent No.: US 12,021,958 B2
(45) Date of Patent: Jun. 25, 2024

(54) METHOD FOR ESTABLISHING SYNCHRONIZATION RELATIONSHIP, CHIP, ELECTRONIC DEVICE, AND NON-TRANSITORY COMPUTER-READABLE STORAGE MEDIUM

(71) Applicant: Shenzhen Goodix Technology Co., Ltd., Guangdong (CN)

(72) Inventors: Shilin Guo, Guangdong (CN); Jinghua Zou, Guangdong (CN); Bo Pi, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 48 days.

(21) Appl. No.: 18/063,630

(22) Filed: Dec. 8, 2022

(65) Prior Publication Data
US 2023/0188312 A1    Jun. 15, 2023

(30) Foreign Application Priority Data
Dec. 10, 2021  (CN) .......................... 202111509137.6

(51) Int. Cl.
*H04L 7/00*       (2006.01)
(52) U.S. Cl.
CPC .................................. *H04L 7/0008* (2013.01)
(58) Field of Classification Search
CPC .................................................... H04L 7/0008
See application file for complete search history.

(56) References Cited

U.S. PATENT DOCUMENTS

| | | | |
|---|---|---|---|
| 9,510,289 B1 | 11/2016 | De Ruijter | |
| 2015/0092642 A1* | 4/2015 | Geboff | H04L 69/329 370/350 |
| 2019/0020433 A1* | 1/2019 | Pitigoi-Aron | H04W 56/001 |
| 2023/0007606 A1* | 1/2023 | Pu | H04W 56/0015 |
| 2023/0188312 A1* | 6/2023 | Guo | H04W 56/005 375/356 |

FOREIGN PATENT DOCUMENTS

| | | |
|---|---|---|
| CN | 109286459 A | 1/2019 |
| CN | 111819891 A | 10/2020 |
| CN | 112714402 A | 4/2021 |
| CN | 113572556 A | 10/2021 |
| RU | 2723269 C1 | 6/2020 |

* cited by examiner

*Primary Examiner* — Jaison Joseph
(74) *Attorney, Agent, or Firm* — USCH Law, PC

(57) ABSTRACT

A method for establishing synchronization relationship, a chip, an electronic device, and a non-transitory computer-readable storage medium are provided. The method includes the following. A synchronization pulse of the master device is initiated according to a pulse period preset. A start time of a K1th synchronization pulse and a start time of a K2th connection event of a slave device are obtained, and an offset time is obtained according to the start time of the K1th synchronization pulse and the start time of the K2th connection event. First synchronization information is transmitted to the slave device for the slave device to start a local synchronization pulse synchronized with the synchronization pulse of the master device according to the first synchronization information. The first synchronization information carries a count value K1, a count value K2, the offset time, and the pulse period.

20 Claims, 17 Drawing Sheets

METHOD FOR ESTABLISHING SYNCHRONIZATION RELATIONSHIP, CHIP, ELECTRONIC DEVICE, AND NON-TRANSITORY COMPUTER-READABLE STORAGE MEDIUM

CROSS REFERENCE TO RELATED APPLICATIONS

The present application claims the benefit of priority under the Paris Convention to Chinese Patent Application No. 202111509137.6 filed on Dec. 10, 2021, which is incorporated herein by reference in its entirety.

TECHNICAL FIELD

The disclosure relates in general to the field of wireless communication technology, and more specifically to a method for establishing synchronization relationship, a chip, an electronic device, and a non-transitory computer-readable storage medium.

BACKGROUND

Medical detection or limb movement trajectory tracking fields involve a large number of distributed data collection, and a host machine needs to fuse data in order to establish corresponding models for data analysis.

At present, all the above scenarios involve multi-device distributed data collection, and data from multiple sensors distributed everywhere are interrelated. Therefore, it is necessary to transmit the data to a fusion end to fuse the data. Generally, the sensors and the fusion end are connected via cables because the reliability of the transmission and the synchronization accuracy are relatively high when the transmission is conducted with the cable. However, the cable may limit a usage scenario and experience of the product. On the other hand, wireless transmission can be used to replace the cable for transmission. However, due to low reliability of the wireless transmission, the data collected by different sensors at the same time are transmitted to the fusion end at different times, which may lead to inaccuracy of data fused by the fusion end.

SUMMARY

Embodiments of the disclosure aims to provide a method for establishing synchronization relationship, a chip, an electronic device, and a storage medium, which can improve synchronization of tasks executed by a plurality of devices in a network.

In view of above technical problems, according to a first aspect, embodiments of the disclosure provide a method for establishing synchronization relationship. The method is applicable to a master device and includes the following. A synchronization pulse is initiated (started) of the master device according to a pulse period preset. A start time of a K1th synchronization pulse and a start time of a K2th connection event of a slave device are obtained, and an offset time is obtained by calculating according to the start time of the Kth synchronization pulse and the start time of the K2th connection event, where a connection between the master device and the slave device is established. First synchronization information is transmitted to the slave device to start a local synchronization pulse synchronized with the synchronization pulse of the master device according to the first synchronization information. The first synchronization information carries a count value K1 of the K1th synchronization pulse, a count value K2 of the K2th connection event, the offset time, and the pulse period.

According to a second aspect, embodiments of the disclosure provide a method for establishing synchronization relationship. The method is applicable to a master device and includes the following. A synchronization pulse of the master device is initiated according to a pulse period preset. Third synchronization information is transmitted according to a channel pre-agreed with a slave device and by taking the pulse period as a transmission period, whereby the slave device initiates a local synchronization pulse synchronized with the synchronization pulse of the master device according to the third synchronization information. The third synchronization information transmitted each time carries a current count value of the synchronization pulse.

According to a third aspect, embodiments of the disclosure provide a method for establishing synchronization relationship. The method is applicable to a slave device and includes the following. A start time t2-local of a (K2-local)-th connection event is obtained, in response to first synchronization information sent by a master device being received in the (K2-local)-th connection event. The first synchronization information carries a count value K1 of a K1th synchronization pulse of the master device, a count value K2 of a K2th connection event, and a pulse period of a synchronization pulse of the master device. An offset time is obtained by calculating according to a start time of the K1th synchronization pulse and a start time of the K2th connection event. A pulse period of a local synchronization pulse of the slave device is set to the pulse period of the synchronization pulse carried in the first synchronization information. A start time of the local synchronization pulse of the slave device and a count value at the start of the local synchronization pulse are set according to at least of the start time t2-local, a count value K2-local, the count value K2, the count value K1, the offset time, and a connection event period of the slave device. The start time of the local synchronization pulse of the slave device is later than a current time of the slave device. The local synchronization pulse is initiated according to the start time of the local synchronization pulse, the pulse period of the local synchronization pulse, and the count value at the start of the local synchronization pulse.

According to a fourth aspect, embodiments of the disclosure provide a method for establishing synchronization relationship. The method is applicable to a slave device and includes the following. Third synchronization information periodically transmitted by a master device on the channel pre-agreed with the master device is received, and a time at which the third synchronization information is received is obtained. A transmission period of the third synchronization information is the same as a pulse period of a synchronization pulse of the master device, and the third synchronization information carries a current count value of the synchronization pulse. A start time of a local synchronization pulse of the slave device is set to the time at which the third synchronization information is received, a count value at start of the local synchronization pulse to the current count value carried in the third synchronization information, and a pulse period of the local synchronization pulse is set to the pulse period of the synchronization pulse carried in the third synchronization information or the transmission period of the third synchronization information. The local synchronization pulse is initiated according to the start time of the local synchronization pulse, the pulse period of the local synchronization pulse, and the count value at the start of the local synchronization pulse.

According to a fifth aspect, embodiments of the disclosure provide a chip. The chip includes a processing part and a storing part. The storing part is configured to store an instruction executable by the processing part. The instruction, when executed by the processing part, causes the processing part to perform the method for establishing synchronization relationship described in any aspect of the disclosure, where the chip serves as a master device or a slave device.

According to a sixth aspect, embodiments of the disclosure provide an electronic device. The electronic device includes at least one processor and a memory in communication connection with the at least one processor. The memory stores an instruction executable by the at least one processor, and the instruction, when executed by the at least one processor, causes the at least one processor to perform the method for establishing synchronization relationship described in any aspect of the disclosure, where the chip serves as a master device or a slave device.

According to a seventh aspect, embodiments of the disclosure provide a computer-readable storage medium. The computer-readable storage medium storing a computer program, wherein the computer program, when executed by a processor, causes the processor to perform the method for establishing synchronization relationship described in any aspect of the disclosure.

Compared with related technologies, in embodiments of the disclosure, the master device initiates a synchronization pulse, generates first synchronization information based on the pulse count value K1 of the synchronization pulse, the connection event count value K2 between the master device and the slave device, and the pulse period of the synchronization pulse, and sends the first synchronization information to the slave device. The slave device calculates relevant parameters for initiating a local synchronization pulse that keeps synchronization with the synchronization pulse of the master device according to the first synchronization information and the current count value of the connection event. The relevant parameters include a start time t1-local of the local synchronization pulse, a pulse count value when the local synchronization pulse is initiated, and a pulse period of the local synchronization pulse. Therefore, the local synchronization pulse can be initiated at the slave device to establish a synchronization relationship between the master and slave devices.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings are denoted as similar elements. The figures in the accompanying drawings do not constitute a proportion limitation unless otherwise stated.

DETAILED DESCRIPTION OF THE EMBODIMENTS

Figure 1:
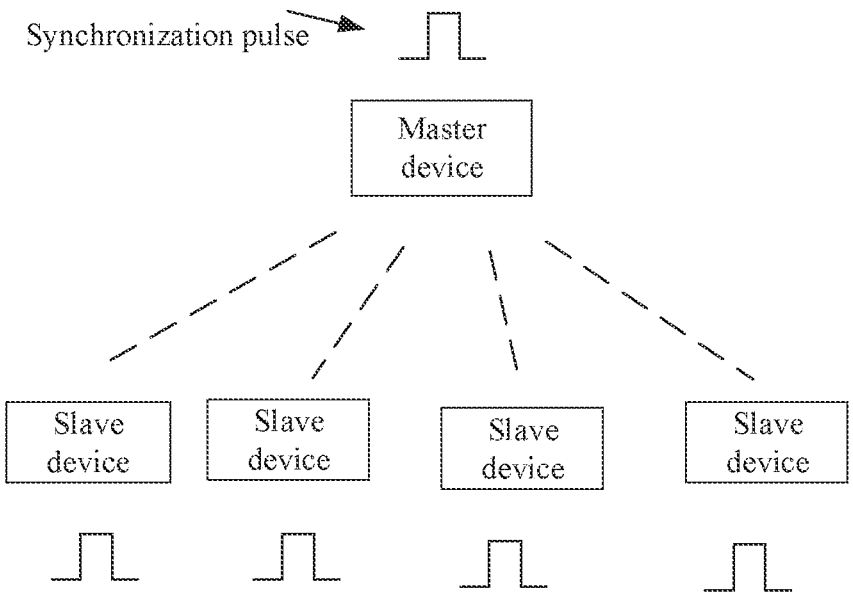
FIG. 1 is a schematic diagram illustrating a master-slave architecture according to embodiments of the disclosure.

Embodiments of the disclosure will be described in detail below with reference to the accompanying drawings in order to make the objectives, technical solutions, and advantages of the present disclosure clearer. However, it will be apparent to those skilled in the art that, in the various embodiments of the present disclosure, numerous technical details are set forth in order to provide the reader with a better understanding of the present disclosure. However, the technical solutions claimed in the present disclosure can be implemented without these technical details and based on various changes and modifications of the following embodiments. The following embodiments are divided to facilitate description, and shall not constitute any limitation to specific implementation of the present disclosure. The embodiments may be combined and refer to each other without any contradiction.

At present, in application fields such as medical detection and limb movement trajectory tracking, a large number of distributed data collection is involved, and a host machine needs to fuse the data. Specific scenarios in the medical detection field may be, for example, electrocardiogram (ECG) acquisition, and specific scenarios in the limb movement trajectory tracking field may be, for example, athlete limb movement tracking, which all involve a typical master-slave architecture. That is, multiple slave devices are responsible for collecting data and transmitting data to a master device, and the master device is configured to fuse the data uploaded by the multiple slave devices. Data transmission between the master-slave architecture can be conducted through wired transmission, for example, each slave device is connected to the master device through a cable. Alternatively, wireless transmission can also be used for data transmission between the master-slave architecture, for example, the wireless transmission between the master-slave architecture is based on a Bluetooth low energy (BLE) technology, which is a commonly used short-range wireless communication technology.

The following may describe embodiments of the disclosure by taking the ECG acquisition scenario as an example. Multiple slave devices are fixed in different parts of a human body, and are used for collecting human body parameters respectively and transmitting the human body parameters to the master device respectively. Each slave device includes a sensor and a Bluetooth chip, where the sensor is configured to collect the human body parameters, and the Bluetooth chip is configured to establish Bluetooth connection with the master device and upload the human body parameters to the master device. The master device, such as a personal computer, is configured to fuse the human body parameters collected by the slave devices to obtain various data for Plotting the ECG. Since the human body parameters are correlated in time, the master device should fuse the data collected at the same time by each slave device.

Generally, each slave device starts collecting upon receiving an instruction of starting collecting from the master device, then encapsulates collected data into different data packets in time sequence, and uploads a plurality of data packets to the master device sequentially. According to a receiving order of the data packets, the master device may fuse data uploaded by each slave device. If the data packets collected by the slave devices are not completely synchronized, even if the transmission process is accurate, the data fused by the master device are not the data collected by each slave device at the same time, that is, the data that have correlation in time cannot be fused accurately.

The disclosure aims to solve the above-mentioned problems caused by wireless transmission, and takes the BLE wireless transmission technology as an example for illustration, but the disclosure being applied in the BLE wireless transmission technology is just an example, and can be applied in other transmission technologies.

BLE devices usually establish a piconet. In the piconet, there are a master device and one or more slave devices. The master device can establish Bluetooth connection with multiple slave devices at the same time, but there is no connection between the multiple slave devices. Generally, the master device and the slave device can communicate based on a asynchronous connection-oriented logical transport (ACL) link, and specifically, the master device and the slave device can communicate based on a connection event of the ACL link. After the connection between the master device and the slave device is established, frequency hopping may occur continuously. Each time frequency hopping occurs, one connection event occurs, and a count value of the connection event is increased by one. There is a connection event counter in each of the slave device and the master device, and the connection event counters in both the slave device and the master device synchronously count connection events of the ACL link. Each connection event lasts for a duration, and the master device and the slave device transmit data within the duration of the connection event. There is a time interval between a start time of a connection event and a start time of an adjacent connection event, which is called a connection event period of the ACL link. In the piconet, the master device establishes an independent ACL link with each slave device, that is, each slave device uniquely corresponds to an ACL link. Therefore, a connection event of the ACL link where the slave device is located can also be called a connection event of the slave device. A connection event period of the ACL link where the slave device is located can also be called a connection event period of the slave device.

Each BLE device, either the master device or the slave device, includes a Bluetooth chip to realize Bluetooth function. There is an independent internal system clock in the Bluetooth chip, which is called Bluetooth clock. The Bluetooth clock controls sending and receiving timing of a timer and synchronization of frequency hopping. The timing and frequency hopping of the piconet are determined by the master device. During connection being established between the master device and the slave device, after each connection event, the slave device calculates an anchor point time of a next connection event according to an anchor point time of a current connection event and a connection event period and performs information sending and receiving when the anchor point time of the next connection event arrives, thus realizing synchronization of sending and receiving timing. That is, after the ACL link is established between the slave device and the master device, synchronization of the sending and receiving timing in data transmission can be realized.

For the same BLE device, there is a same clock reference system. That is, all function clocks in the same BLE device share a same clock source. For example, function clock A is a clock after 2 times a frequency of the clock source, and function clock B is a clock after 3 times the frequency of the clock source. Therefore, when drift occurs, all the function clocks go at a same speed and in a same direction at the same time.

In embodiments of the disclosure, the master device and multiple slave devices cooperate with each other to realize establishment of synchronous relationship between the master device and the slave devices. FIG. 1 is a schematic diagram illustrating a master-slave architecture. In FIG. 1, the multiple slave devices refer to two or more slave devices, and only four slave devices are illustrated in the figure. The disclosure is not limited thereto. The master device and each slave device can communicate based on the BLE ACL link. Although the embodiments of the disclosure are described in the case of communication based on the BLE ACL link, the embodiments of the disclosure are not limited thereto. The method for establishing synchronization relationship of the disclosure is applicable to any communication protocol based on connectionless and connection event-oriented communication.

Figure 2:
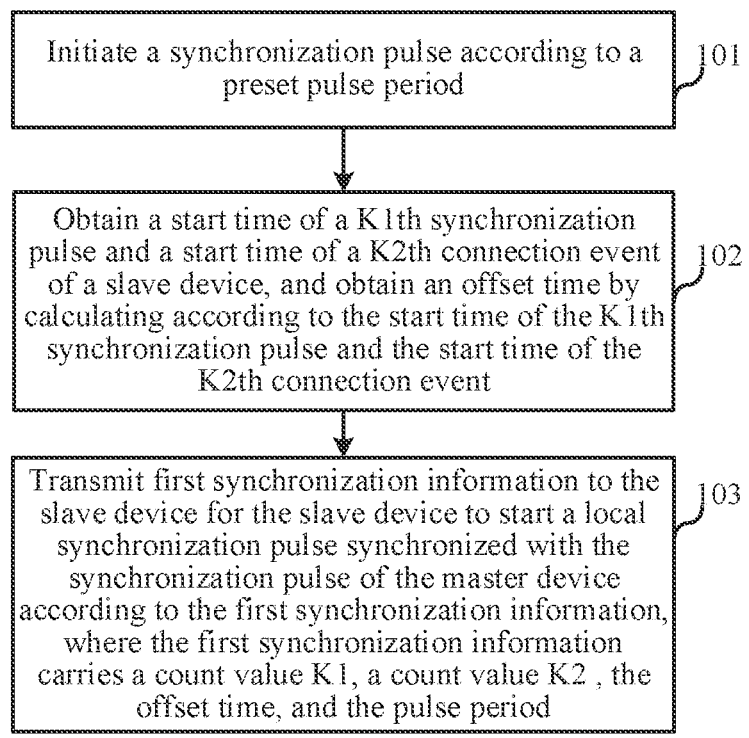
FIG. 2 is a flow chart illustrating an example of a method for establishing synchronization relationship performed by a master device according to embodiments of the disclosure.

In some embodiments, the method for establishing synchronization relationship illustrated in FIG. 2 is applied to a master device. The method begins at 101.

At 101, a synchronization pulse is initiated (started) according to a preset pulse period.

At 102, a start time of a K1th synchronization pulse and a start time of a K2th connection event of a slave device are obtained, and an offset time is obtained by calculating according to the start time of the K1th synchronization pulse and the start time of the K2th connection event, where a connection between the master device and the slave device is established.

At 103, first synchronization information is transmitted to the slave device for the slave device to start a local synchronization pulse synchronized with the synchronization pulse of the master device according to the first synchronization information, where the first synchronization information carries a count value K1 of the K1th synchronization pulse, a count value K2 of the K2th connection event, the offset time, and the pulse period.

In operations at 101, the pulse period of the synchronization pulse is preset in the master device, and the master device initiates the synchronization pulse based on the local clock, such as the synchronization pulse illustrated in FIG. 1. The master device can start the synchronization pulse after initialization is successful, or start the synchronization pulse after a connection between the master device and the slave device is established. That is, there is no restriction on an executing sequence of initiating the synchronization pulse and establishing the connection between the master device and the slave device by the master device. Moreover, a value of the pulse period is set according to actual needs and has no relationship with the connection event period. Therefore, the master device uses the synchronization pulse to realize the synchronization period for synchronization with the slave device, which is not limited by the connection event period.

In operations at 102, the master device can select a synchronization pulse, record a pulse count value of the synchronization pulse as K1, and obtain a start time t1 of a K1th synchronization pulse. The master device can also select a connection event, record a connection event count value as K2, and obtain a start time t2 of a K2th connection event. Since the same device is based on a same time reference system, the obtained start time t1 of the K1th synchronization pulse and the start time t2 of the K2th connection event are both based on the same time reference system of the master device. Specifically, the local clock can be understood as a device internal clock source for the device to provide clocks with different frequencies, where the Bluetooth clock is a clock with a frequency provided based on the local clock. Therefore, the local clock for initiating the synchronization pulse and the Bluetooth clock for controlling the Bluetooth connection between the master device and the slave device may be different in terms of frequency. However, since both the local clock and the Bluetooth clock are taken the local clock as the time reference system (i.e., reference time), there is a preset corresponding relationship between a frequency of the local clock and a frequency of the Bluetooth clock. In the master device, the start time t1 directly acquired takes the local clock as the time reference system, and the start time t2 directly acquired takes the Bluetooth clock as the time reference system. If the local clock is taken as a common time reference system, the start time t2 directly acquired can be converted into a time which takes the local clock as the time reference system. On the contrary, if the Bluetooth clock is taken as the common time reference system, the start time t1 directly acquired can be converted into a time which takes the Bluetooth clock as the time reference system. Alternatively, the start time t1 and the start time t2 directly acquired can be simultaneously converted into times corresponding to another time reference system. In any case, the conversion only needs to satisfy that the start time t1 and the start time t2 are times corresponding to the same time reference system.

In one example, the master device can arbitrarily select the pulse count value K1 and the connection event count value K2, that is, the start time t1 of the K1th synchronization pulse can be earlier than, equal to, or later than the start time t2 of the K2th connection event. The master device obtains a difference between the start time t1 of the K1th synchronization pulse and the start time t2 of the K2th connection event as an offset time offset.

In one example, the start time t1 of the K1th synchronization pulse finally selected by the master device is later than the start time t2 of the K2th connection event. Specifically, if the start time t1 of the K1th synchronization pulse first selected by the master device is earlier than or equal to the start time t2 of the K2th connection event, the master device can re-select a larger value of K1 or a smaller value of K2 to make the start time t1 of the K1th synchronization pulse later than the start time t2 of the K2th connection event. In this case, the offset time offset is a value greater than zero. In this way, it is convenient for the slave device to subsequently calculate a start time of a local synchronization pulse.

Figure 3:
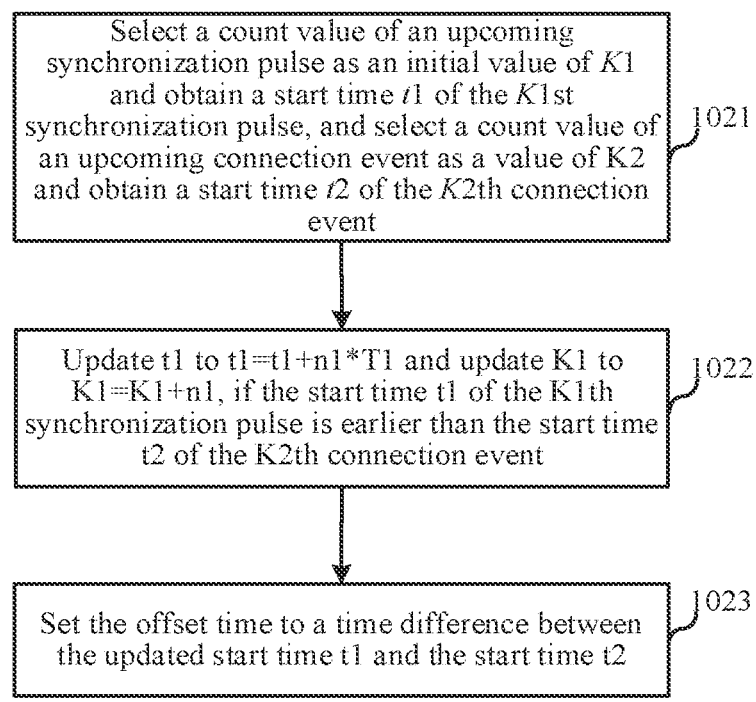
FIG. 3 is an exemplary flow chart of a master device calculating an offset time according to embodiments of the disclosure.

FIG. 3 is an exemplary implementation of making the start time t1 of the selected K1th synchronization pulse later than the start time t2 of the K2th connection event. The operations at 102 may specifically include operations at 1021 to 1023.

At 1021, a count value of an upcoming synchronization pulse is selected as an initial value of K1 and a start time t1 of the K1th synchronization pulse is obtained, and a count value of an upcoming connection event is selected as a value of K2 and a start time t2 of the K2th connection event is obtained.

Specifically, the count value K1 of the upcoming synchronization pulse refers to a next count value of a current count value of the synchronization pulse. For example, the current count value is 5, which means that five synchronization pulses have been generated since the synchronization pulse is initiated (started), then a sixth synchronization pulse will be initiated, and the count value K1 of the upcoming synchronization pulse is 6. The master device obtains a start time t1 of the sixth synchronization pulse. Similarly, the count value K2 of the upcoming connection event refers to a next count value of a current count value of the connection event. For example, the current count value of the connection event is 8, which means that eight connection events have been generated since the connection between the master device and the slave device is established, then a ninth connection event is followed, and the count value K2 of the upcoming connection event is 9. The master device obtains a start time t2 of the ninth connection event.

At 1022, if the start time t1 of the K1th synchronization pulse is earlier than the start time t2 of the K2th connection event, t1 is updated to t1+n1*T1 (i.e., t1=t1+n1*T1) and K1 is updated to K1+n1 (i.e., K1=K1+n1), where T1 represents the pulse period of the synchronization pulse, and n1 is a positive integer to make an updated t1 later than t2.

In one example, the master device may compare the start time t1 of the K1th synchronization pulse and the start time t2 of the K2th connection event. If t1 is less than t2, it indicates that t1 is earlier than t2, and the master device updates t1 to t1 plus the pulse period T1 (t1=t1+T1) and increases K1 by 1 (K1=K1+1). The master device proceeds to compare the updated t1 and t2. If the updated t1 is still less than t2, the master device continues to update t1 to t1 plus pulse period T1 and increase K1 by 1 until the updated t1 is greater than t2. In this way, updating of t1 and K1 is completed, and n1 represents the number of times K1 increases by 1. That is, the updated t1 and K1 are taken as the finally determined t1 and K1. In this example, n1 is a minimum positive integer that makes the updated t1 later than t2. In this case, the determined t1 is a time of a synchronization pulse closest to a current time. In other examples, n1 can also be a larger positive integer, as long as the updated t1 is greater than t2. The start time t1 determined by the master device is a future time, which can reduce the calculation amount of calculating the start time of the local synchronization pulse by the slave device. For details, reference may be made to specific illustration in the method for establishing synchronization relationship executed by the slave device.

Figure 4A:
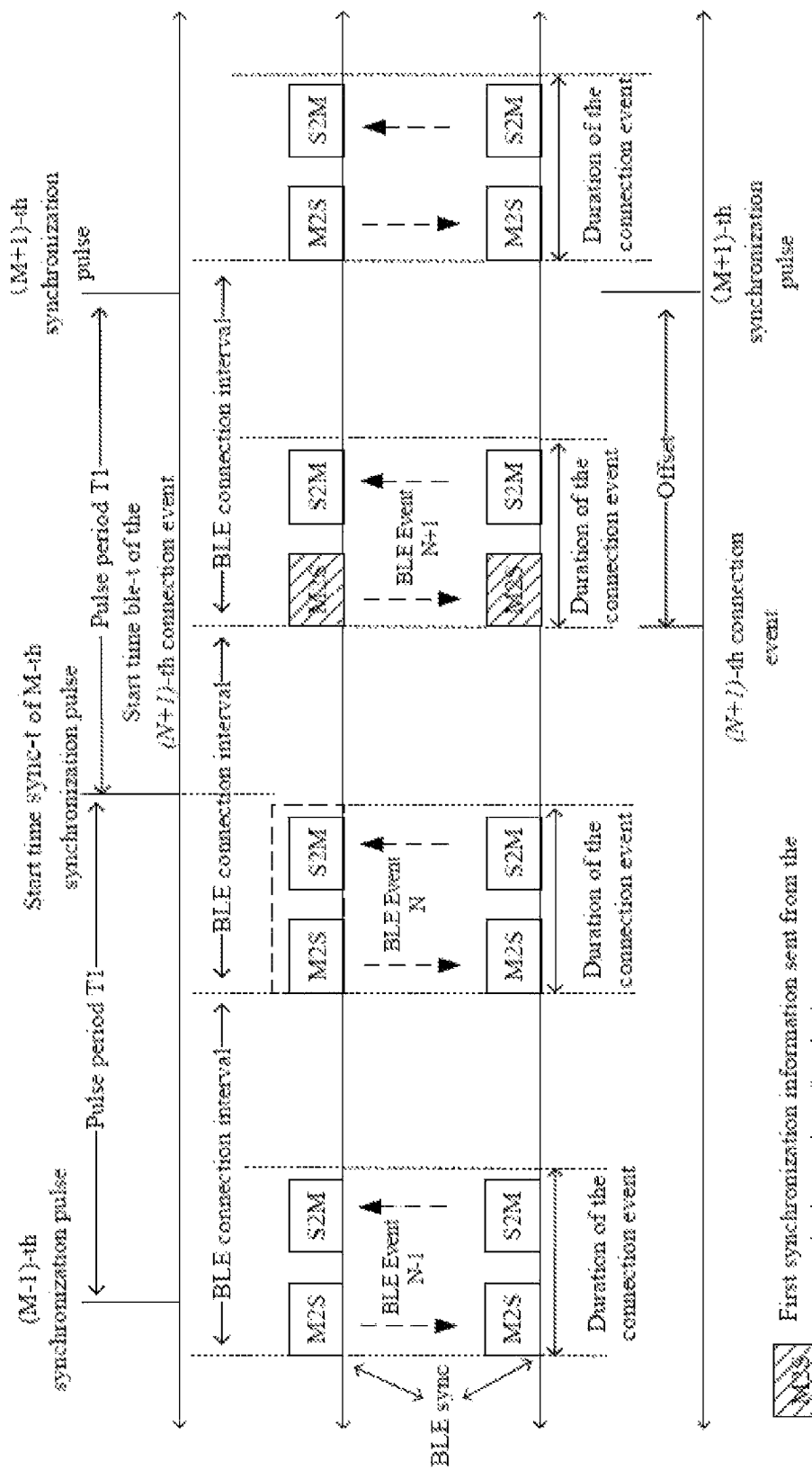
FIG. 4A is a schematic diagram of a first example of a relative time relationship between synchronization pulses and connection events according to embodiments of the disclosure.

As illustrated in FIG. 4A, a BLE event refers to a BLE connection event, and a BLE connection interval refers to a connection event period, that is, a time interval between start times of two connection events (i.e., a time interval between a start time of a connection event and a start time of an adjacent connection event). BLE EventN refers to a N-th connection event. Each connection event lasts for a duration, and the master device and the slave device transmit data within the duration of each connection event. If a current N-th connection event has just occurred, the count value of the upcoming synchronization pulse is M, that is, K1=M, and the count value of the upcoming connection event is N+1, that is, K2=N+1. It can be clearly seen from the figure that the start time t1 of the M-th synchronization pulse is obviously earlier than the start time t2 of the (N+1)-th connection event, and the start time of the (M+1)-th synchronization pulse is later than the start time of the (N+1)-th connection event. Therefore, in this case, only K1 needs to be updated to M+1 (i.e., K1=M+1), and the start time of the (M+1)-th synchronization pulse is t1=t1+T1. In this example, n1 is equal to 1, that is, the value of n1 is the minimum positive integer that makes the updated t1 later than t2. Optionally, the value of n1 can also be an integer greater than or equal to 2. In this example, the master device sends the first synchronization information to the slave device in the (N+1)-th connection event.

On the other hand, if the master device determines that the start time t1 of the K1th synchronization pulse is later than or equal to the start time t2 of the K2th connection event, there is no need to update the value of t1 and K1. The selected value of K1 and the start time t1 of the K1th synchronization pulse are directly taken as the finally determined value of K1 and t1.

Figure 4B:
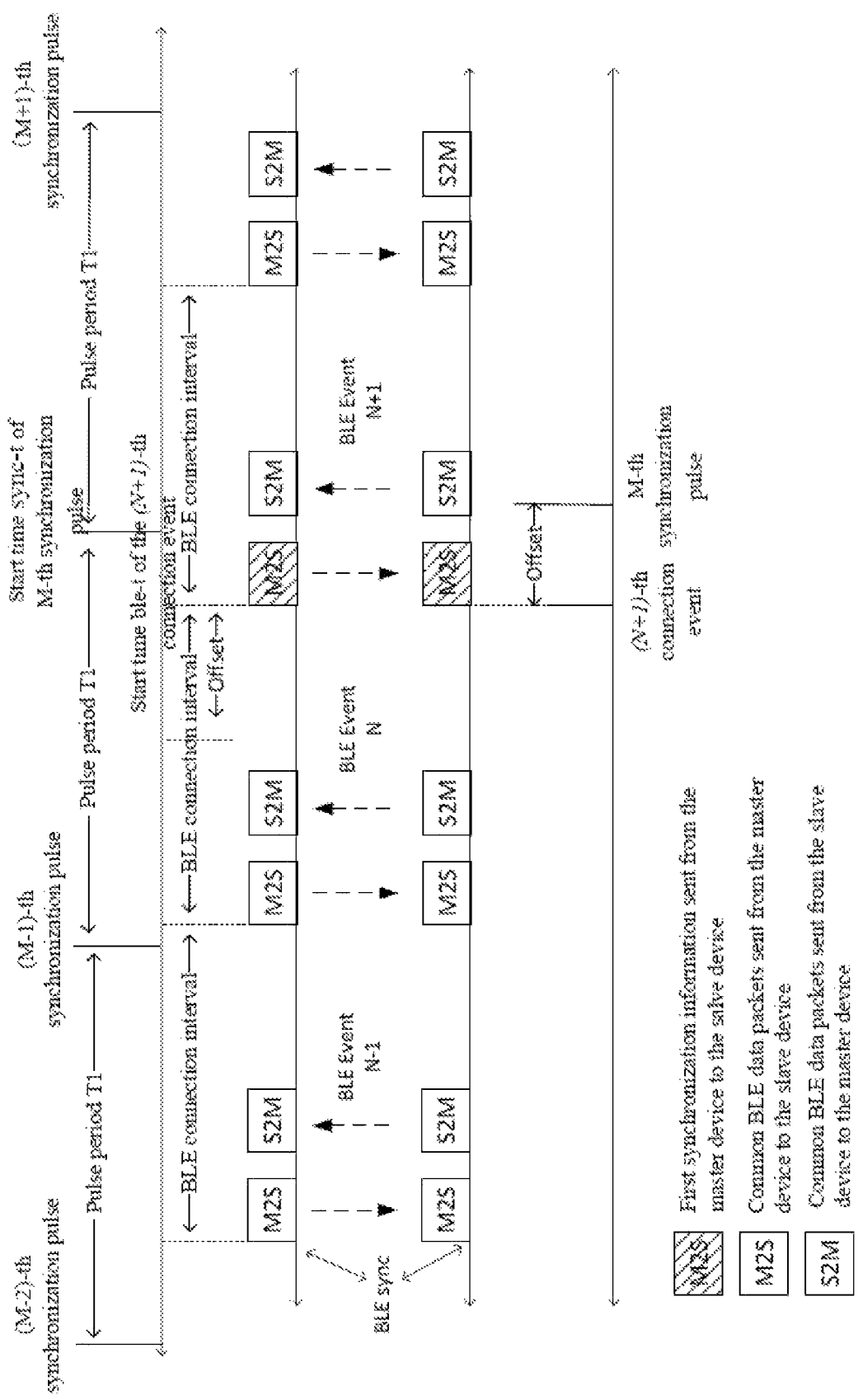
FIG. 4B is a schematic diagram of a second example of the relative time relationship between synchronization pulses and connection events according to embodiments of the disclosure.

As illustrated in FIG. 4B, the count value of the upcoming synchronization pulse is M, i.e., the initial value of K1 is M. The count value of the upcoming connection event is N+1, that is, the value of K2 is N+1. It is obvious from the figure that the start time t1 of the M-th synchronization pulse is obviously later than the start time t2 of the (N+1)-th connection event. Therefore, values of t1 and K1 are not updated. In this example, the master device sends the first synchronization information to the slave device in the (N+1)-th connection event.

The synchronization pulse and the connection event are independent of each other, so the count value K1 of the upcoming synchronization pulse is not related to the count value K2 of the upcoming connection event. Moreover, a relationship between the start time t1 and the start time t2 is not affected by the relationship between the count value K1 and the count value K2.

Figure 4C:
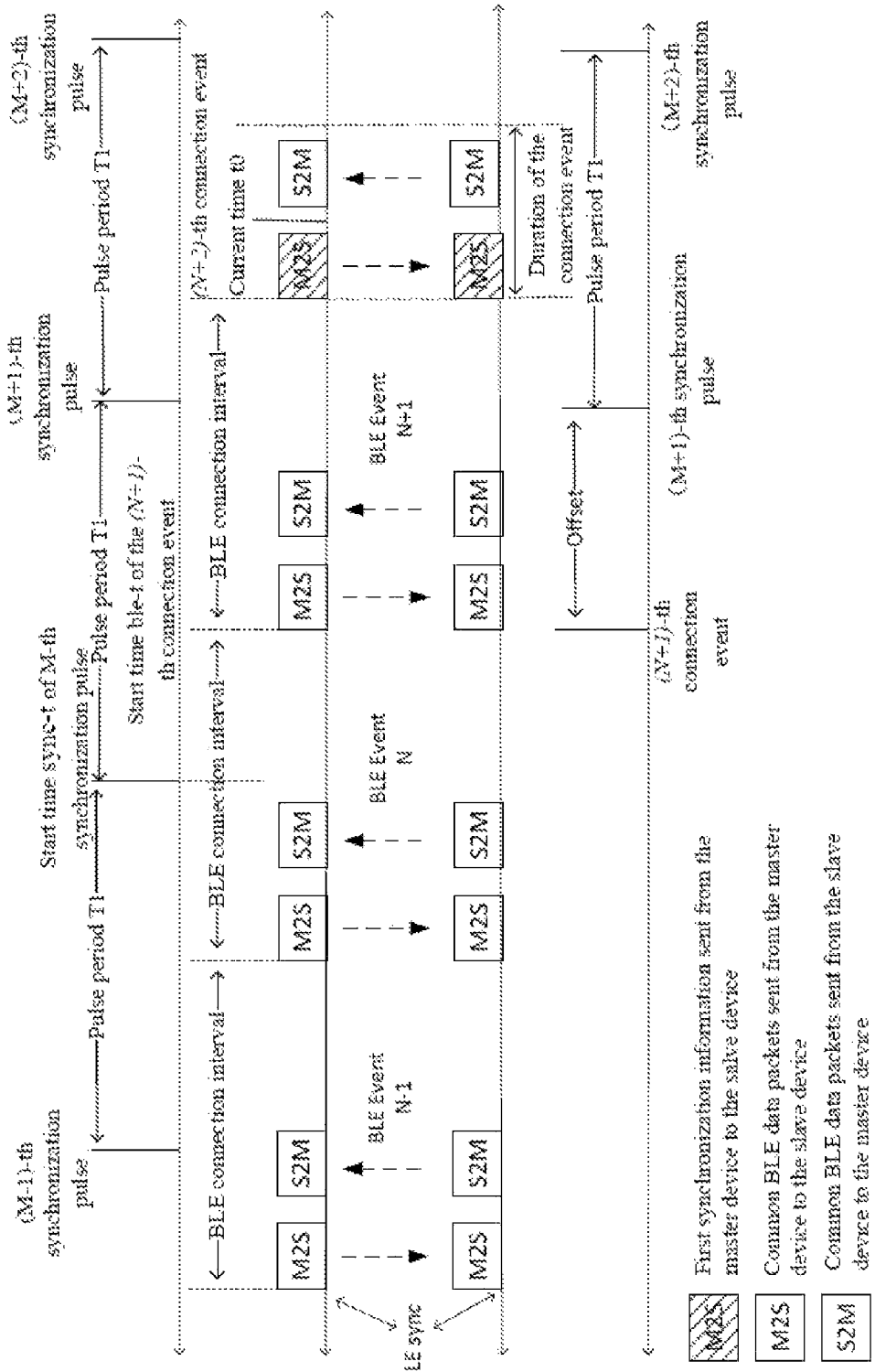
FIG. 4C is a schematic diagram of a third example of the relative time relationship between synchronization pulses and connection events according to embodiments of the disclosure.

Compared to FIG. 4A, as illustrated in FIG. 4C, the first synchronization information is transmitted to the slave device in a (N+2)-th connection event, that is, the first synchronization information is transmitted to the slave device in a duration of the (N+2)-th connection event.

Figure 4D:
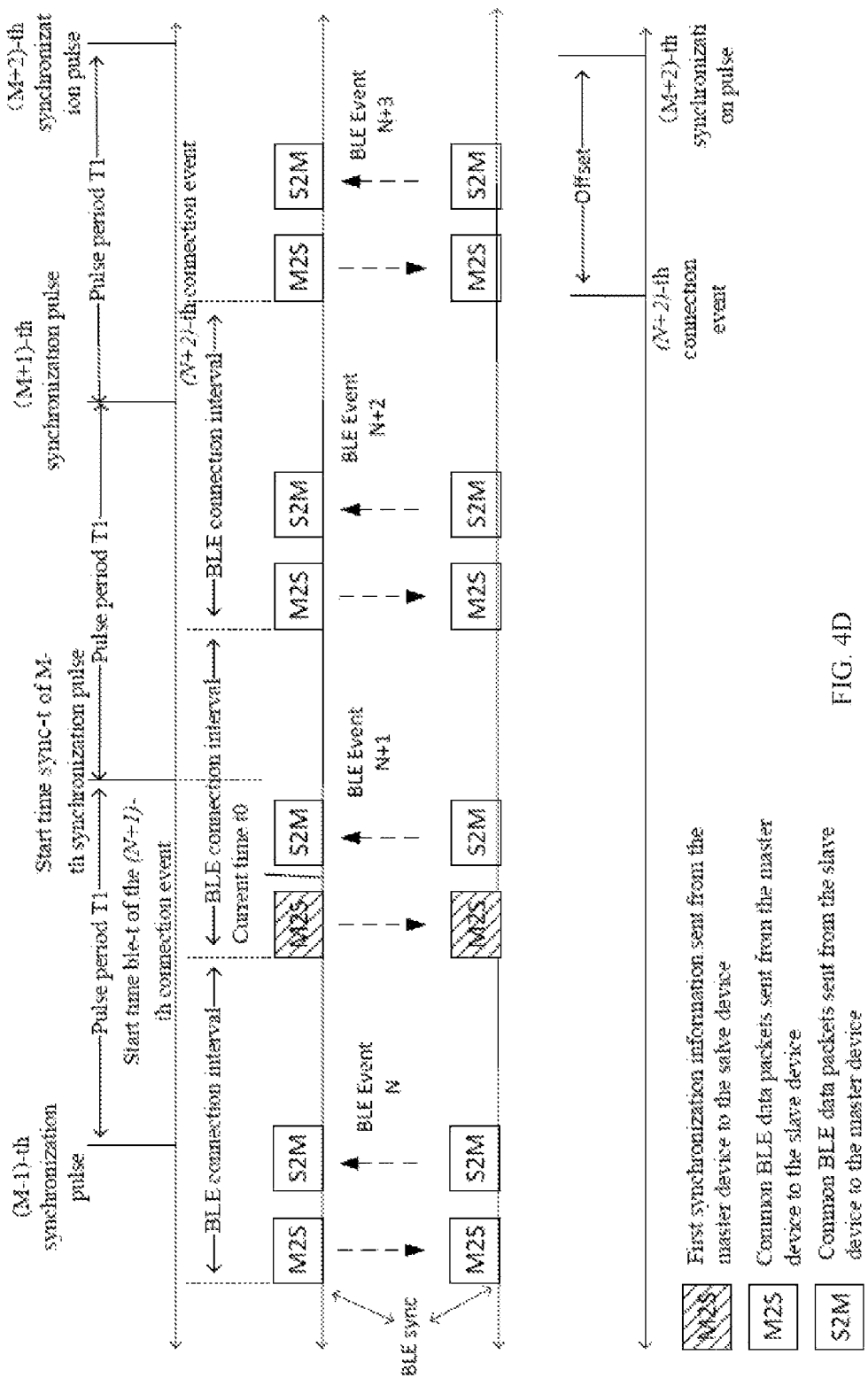
FIG. 4D is a schematic diagram of a fourth example of the relative time relationship between synchronization pulses and connection events according to embodiments of the disclosure.

As illustrated in FIG. 4D, the count value of the current connection event is N. Compared to FIG. 4B, in FIG. 4D, although the upcoming synchronization pulse is the M-th synchronization pulse, the master device selects a start time of a (M+2)-th synchronization pulse as a time synchronization point of the slave device. That is, K1 carried in the first synchronization information is set to M+2 (i.e., K1=M+2), and K2 in the first synchronization information is set to N+3 (i.e., K2=N+3).

At 1023, a time difference between the updated start time t1 and start time t2 is determined as the offset time offset.

Specifically, a value of the offset time offset is obtained by subtracting the value of t2 from the value of the finally determined t1. Since the value of the finally determined t1 is greater than the value of t2, the value of the offset time offset is greater than zero.

In operations at 103, the master device may send the first synchronization information to the slave device in any of subsequent connection events. During interaction of the BLE devices, the first synchronization information is encapsulated into a BLE data packet format for transmission. Alternatively, during device interaction based on other protocols, the first synchronization information is encapsulated into a data format supported by the other protocols for transmission.

In one example, the master device may send the first synchronization information to the slave device in the upcoming connection event. As illustrated in FIG. 4A, that is, the master device may send the first synchronization information to the slave device within a duration of the upcoming connection event. In this way, the master device can send the first synchronization information to the slave device as early as possible. When the value of t1 is determined according to operations at 1021 to 1023 illustrated in FIG. 3, the determined start time t1 of the K1th synchronization pulse is the time of the synchronization pulse closest to the current time, and the K2th connection event is a connection event that will occur within a time closest to the current time. Therefore, the master device transmits the first synchronization information to the slave device in the K2th connection event.

In this case, the time at which the local synchronization pulse is set by the slave device can be made as close as possible to the time at which the first synchronization information is determined, so that the synchronization accuracy can be improved as much as possible. The reason is that the master device determines the data in the first synchronization information based on the local clock of the master device, while the slave device sets the local synchronization pulse based on the first synchronization information and the local clock of the slave device. However, there is a frequency deviation (also known as parts per million (PPM)) between the local clock of the master device and the local clock of the slave device. A relatively large difference between the time at which the local synchronization pulse is set by the slave device and the time at which the master device determines the first synchronization information may lead to a large accumulated error caused by the PPM. If the difference between the time at which the local synchronization pulse is set by the slave device and the time at which the master device determines the first synchronization information is in a short time, it can be considered that the accumulated error is relatively small or even can be ignored, so that the problem of low synchronization accuracy caused by the PPM of the local clock can be reduced as much as possible.

Figure 5:
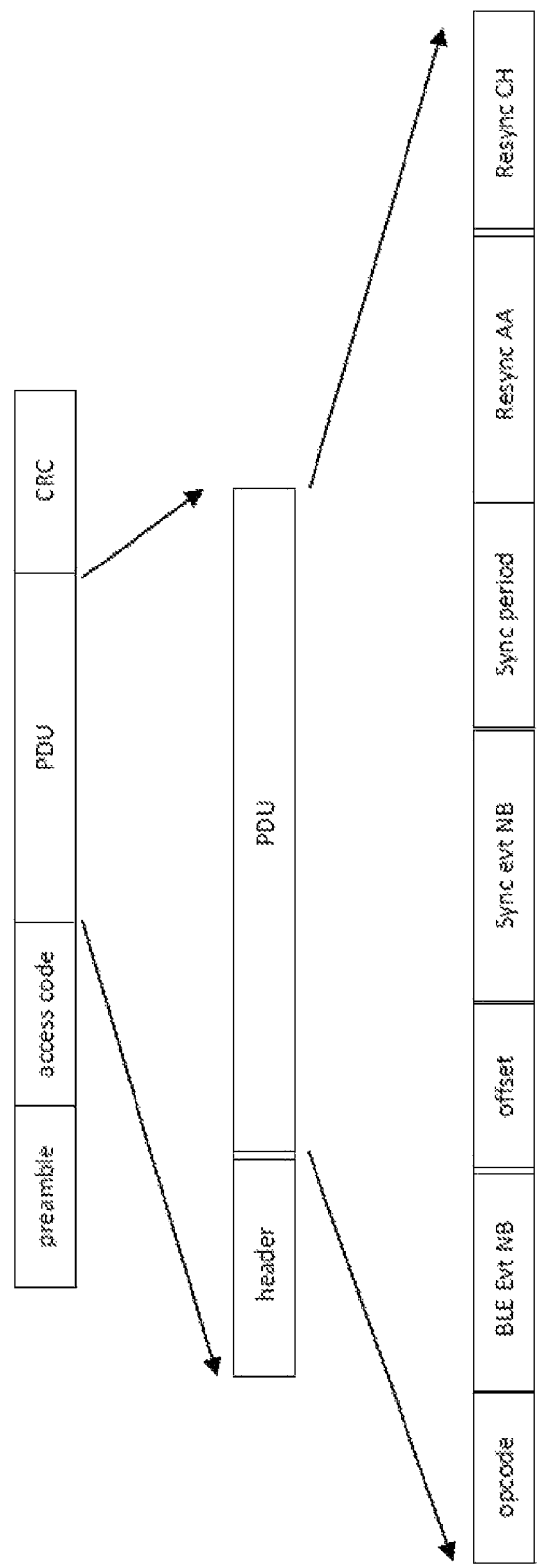
FIG. 5 is a schematic diagram illustrating a data format of first synchronization information according to embodiments of the disclosure.

The first synchronization information is transmitted in a data format supported by the wireless connection between the master device and the slave device. For example, in the BLE technology, the data format of the first synchronization information is illustrated in FIG. 5, and includes a preamble, an access code, a protocol data unit (PDU), and a cyclic redundancy check (CRC). The pulse count value K1, the connection event count value K2, the offset time offset, and the pulse period T1 are carried in the PDU. As illustrated in FIG. 5, the PDU includes a plurality of fields. Specifically, the opcode field is used to carry the opcode, the BLE Evt NB field is used to carry the connection event count value K2, the offset field is used to carry the offset time offset, the Sync evt NB field is used to carry the pulse count value K1, the Sync period field is used to carry the pulse period T1, and the Resync AA field and the Resync CH field are respectively used to carry an access code and a channel identification in a next synchronization.

Figure 6A:
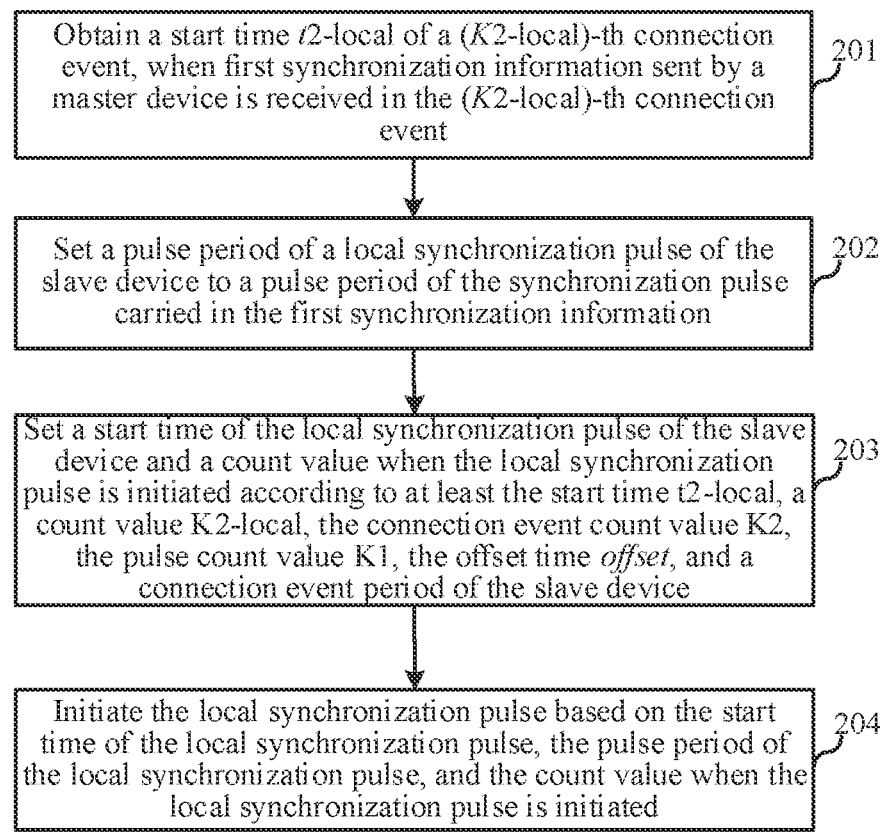
FIG. 6A is a flow chart illustrating an example of a method for establishing synchronization relationship performed by a slave device according to embodiments of the disclosure.

In some embodiments, the method for establishing synchronization relationship illustrated in FIG. 6A is applied to a slave device and begins at 201.

At 201, when first synchronization information sent by a master device is received in a (K2-local)-th connection event, a start time t2-local of the (K2-local)-th connection event is obtained.

The first synchronization information carries a pulse count value K1 of a synchronization pulse of the master device, a count value K2 of the connection event of the slave device, a pulse period T1 of the synchronization pulse, and an offset time offset obtained by calculating according to a start time t1 of a K1th synchronization pulse and a start time t2 of a K2th connection event.

At 202, a pulse period of a local synchronization pulse of the slave device is set to the pulse period of the synchronization pulse carried in the first synchronization information.

At 203, a start time of the local synchronization pulse of the slave device and a count value when the local synchronization pulse is initiated are set according to at least the start time t2-local, a count value K2-local, the count value K2, the pulse count value K1, the offset time offset, and a connection event period of the slave device.

At 204, the local synchronization pulse is initiated based on the start time of the local synchronization pulse, the pulse period of the local synchronization pulse, and the count value when the local synchronization pulse is initiated.

After the master device generates the first synchronization information according to the method in the foregoing embodiments, the first synchronization information is sent to the slave device.

The method for establishing synchronization relationship executed by the slave device corresponds to the method for establishing synchronization relationship executed by the master device. After successfully receiving the first synchronization information, the slave device identifies from the first synchronization information, the pulse count value K1 of the synchronization pulse, the count value K2 of the connection event, the pulse period T1 of the synchronization pulse, and the offset time offset. After successfully receiving the first synchronization information, the slave device further obtains a start time t2-local of the current connection event, where a count value of the current connection event is recorded as K2-local.

According to the data identified from the first synchronization information and the obtained start time t2-local of the (K2-local)-th connection event, the slave device needs to determine relevant parameters for initiating the local synchronization pulse. The relevant parameters include a start time t1-local of the local synchronization pulse, a count value K1-local when the local synchronization pulse is initiated, and a pulse period T2 of the local synchronization pulse. The pulse period T2 of the local synchronization pulse is identical with the pulse period T1 of the synchronization pulse of the master device, that is, T2=T1.

In operations at 203, the start time t1-local of the local synchronization pulse and the count value K1-local when the local synchronization pulse is initiated are determined. Operations at 203 are implemented as follows.

The start time t1-local of the local synchronization pulse of the slave device is set to t1-local=t2-local−(K2-local−K2) *T0+offset, and the count value K1-local at the start of the local synchronization pulse is set to K1-local=K1, where T0 represent the connection event period of the slave device.

If the start time t1-local is earlier than a current time of the slave device, the value of t1-local is updated to t1-local=t1-local+n2*T1, and K1-local is updated to K1-local=K1-local+n2, where n2 is a positive integer that makes an updated t1-local later than the current time of the slave device.

Specifically, in the master-slave link, a connection event count value of the master device is always consistent with the connection event count value of the slave device, so the current connection event count value K2-local recorded by the slave device is also the current connection event count value recorded by the master device. Therefore, the start time t2-local of the K2-local connection event of the slave device can be expressed as t2-local−(K2-local−K2)*T0, where T0 represents the connection event period. When the start time t1 of the K1th synchronization pulse is mapped to the slave device, the start time t1-local of the local synchronization pulse of the slave device is expressed as t1-local=t2-local−(K2-local−K2)*T0+offset. The slave device also compares the start time t1-local with the current time of the slave device. If the start time t1-local is earlier than the current time of the slave device, it means that the start time of the K1th synchronization pulse has passed. In this case, it is necessary to update the start time t1-local to a future time to start the local synchronization pulse.

The slave device can update the start time t1-local to t1-local=t1-local+n2*T1, and update K1-local to K1-local=K1-local+n2, where n2 is a positive integer to make an updated t1-local later than the current time of the slave device.

In one example, the value of n2 may be a minimum positive integer that makes the updated t1-local later than the current time on the slave device. Specifically, the slave device can update t1-local to t1-local plus one pulse period (t1-local=t1-local+T1) and increase K1-local by one K1-local=K1-local+1, and then determine whether an updated t1-local is earlier than the current time of the slave device. If the updated t1-local is still earlier than the current time of the slave device, the slave device continues to update t1-local to t1-local plus one pulse period and increase K1-local by one until it is determined that a newly updated t1-local is later than or equal to the current time of the slave device, where n2 represents the number of times the slave device increases t1-local by one pulse period. In this case, the value of updated t1-local and the value of K1-local obtained are finally determined values, and the finally determined start time t1-local of the local synchronization pulse is a time point closest to the current time of the slave device, which may avoid that the synchronization accuracy is reduced due to frequency deviation of the local clock as much as possible.

In one example, in operations at 203, after the start time t1-local of the local synchronization pulse of the slave device is set to t1-local=t2-local−(K2-local−K2)*T0+offset, and the count value K1-local at the start of the local synchronization pulse is set to K1-local=K1, if it is determined that the start time t1-local is later than or equal to the current time of the slave device, it indicates that the start time t1-local is a future time, and thus there is no need to update the value of t1-local. In this case, the amount of calculation of the slave device is relatively small. That is, when the start time t1 set by the master device is a future time, the amount of calculation for calculating the start time of the local synchronization pulse by the slave device can be reduced.

As illustrated in FIG. 4A, in this example, the slave device receives the first synchronization information from a (N+1)-th connection event, that is, the obtained K2-local is N+1, and a start time t2-local of the (N+1)-th connection event is obtained. Since K2 carried in the first synchronization information is also N+1, the start time t1-local of the local synchronization pulse of the slave device is t1-local=t2-local−(K2-local−K2)*T0+offset=t2-local+offset. That is, a length of time after the start time of the (N+1)-th connection event is the offset time offset. When the length of time ends, the local synchronization pulse is initiated, the count value when the local synchronization pulse is initiated is M+1, and the pulse period of the local synchronization pulse is T1.

Compared to FIG. 4A, in FIG. 4C, the slave device receives the first synchronization information from the (N+2)-th connection event. In this case, the count value K2-local is N+2, and the start time t2-local of the (N+2)-th connection event is obtained. The start time t1-local of the local synchronization pulse calculated according to t1-local=t2-local−(K2-local−K2)*T0+offset is a start time of a (M+1)-th synchronization pulse. It can be clear from the figure that the start time of the (M+1)-th synchronization pulse is earlier than the start time t2-local of the (N+2)-th connection event, so it is obvious that the start time of the (M+1)-th synchronization pulse is earlier than the current time of the slave device. In other words, the start time t1-local of the local synchronization pulse currently calculated has passed. In this case, the start time t1-local of the local synchronization pulse needs to be updated to cause that the start time t1-local is a future time. It can be seen from the figure that the start time of the (M+2)-th synchronization pulse is later than the start time of the (N+2)-th connection event. If the current time of the slave device is t0 illustrated in the figure, the start time of the (M+2)-th synchronization pulse is later than the current time t0. In this case, for the formula t1=t1+n2*T1, n2 can take the value of 1, and t1-local can be updated to t1-local=t1-local+T1 and K1-local can be updated to K1-local=K1-local+1. In this example, n2=1, which is a minimum integer value of n2 that makes an updated t1-local later than the current time. Optionally, n2 can also be an integer greater than or equal to 2.

In one example, in operations at 203, when the start time t1-local of the local synchronization pulse of the slave device is set to t1-local=t2-local−(K2-local−K2)*T0+offset, and the count value K1-local when the local synchronization pulse is initiated is set to K1-local=K1, if it is determined that t1-local is later than the current time of the slave device and there is a relative large time difference between t1-local and the current time of the slave device, it means that the local synchronization pulse will be started after a long time, which may reduce synchronization accuracy due to the PPM. In this case, the slave device can also actively update t1-local to a time closer to the current time of the slave device. Specifically, if the star time t1-local is later than the current time of the slave device and K2−K2-local≥2, t1-local is updated to t1-local=t1-local−n3*T1, and K1-local is updated to K1-local=K1-local−n3, where n3 is a maximum positive integer to make t1-local later than a start time (t2-local+T0) of a (K2-local+1)-th connection event.

Referring to FIG. 4D, in this example, after receiving the first synchronization information from the (N+1)-th connection event, the slave device determines that the start time t1-local (corresponding to the start time of the (M+2)-th synchronization pulse in the figure) of the local synchronization pulse is later than the current time t0, K2 carried in the first synchronization information is equal to N+3 (i.e., K2=N+3), the current count value K2-local is equal to N+1 (i.e., K2-local=N+1), and K2−K2-local≥2. In this case, the time synchronization point of the slave device can be moved forward. Specifically, based on t1-local=t1-local−n3*T1, n3 can take the value of 2, so the start time t1-local of the local synchronization pulse is equal to t1-local−2*T1 (i.e., t1-local=t1-local−2*T1), and the count value K1-local when the local synchronization pulse is initiated is equal to K1-local−2 (i.e., K1-local=K1-local−2=M). That is, the time synchronization point of the slave device is moved to the start time of the M-th synchronization pulse. In this example, n3=2, which is the maximum positive integer to make t1-local later than the start time of the (N+1)-th connection event; Optionally, n3=1.

In the embodiment of the disclosure, the master device initiates a synchronization pulse, generates first synchronization information based on the pulse count value K1 of the synchronization pulse, the count value K2 of the connection event between the master device and the slave device, and the pulse period of the synchronization pulse, and sends the first synchronization information to the slave device. The slave device calculates relevant parameters for initiating a local synchronization pulse that keeps synchronization with the synchronization pulse of the master device according to the first synchronization information and the current count value of the connection event. The relevant parameters include a start time t1-local of the local synchronization pulse, a pulse count value K1-local when the local synchronization pulse is initiated, and a pulse period T2 of the local synchronization pulse. Therefore, the local synchronization pulse can be initiated at the slave device to establish a synchronization relationship between the master and slave devices.

The method for establishing synchronization relationship executed by the master device corresponds to the method for establishing synchronization relationship executed by the slave device, to make that the synchronization pulse initiated by the master device to be synchronized to the slave device. That is, the slave device initiates a local synchronization pulse with the same pulse period as the synchronization pulse of the master device, where the pulse count value of the local synchronization pulse is the same as the pulse count value of the synchronization pulse of the master device at a same time point. As such, a synchronization relationship is established between the master and slave devices. Establishing synchronization relationships in different scenarios can be of different uses. For example, in the ECG acquisition scenario, multiple slave devices each start a local synchronization pulse. Since the local synchronization pulse initiated by each slave device is aligned with the synchronization pulse of the master device, the local synchronization pulses of the slave devices are also synchronized. Each slave device collects data based on the local synchronization pulse to obtain a data packet, i.e., the data collected in each pulse period of the local synchronization pulse forms a data packet, and the collected data packets are sequentially uploaded to the master device. Because the local synchronization pulses of the slave devices are kept synchronized, the data packets collected by the slave devices sequentially are also synchronized. Therefore, the master device may fuse the data uploaded by each slave device according to the receiving sequence of the data packets, such that the data that have correction can be fused accurately under the condition that the transmission process is accurate.

Figure 6B:
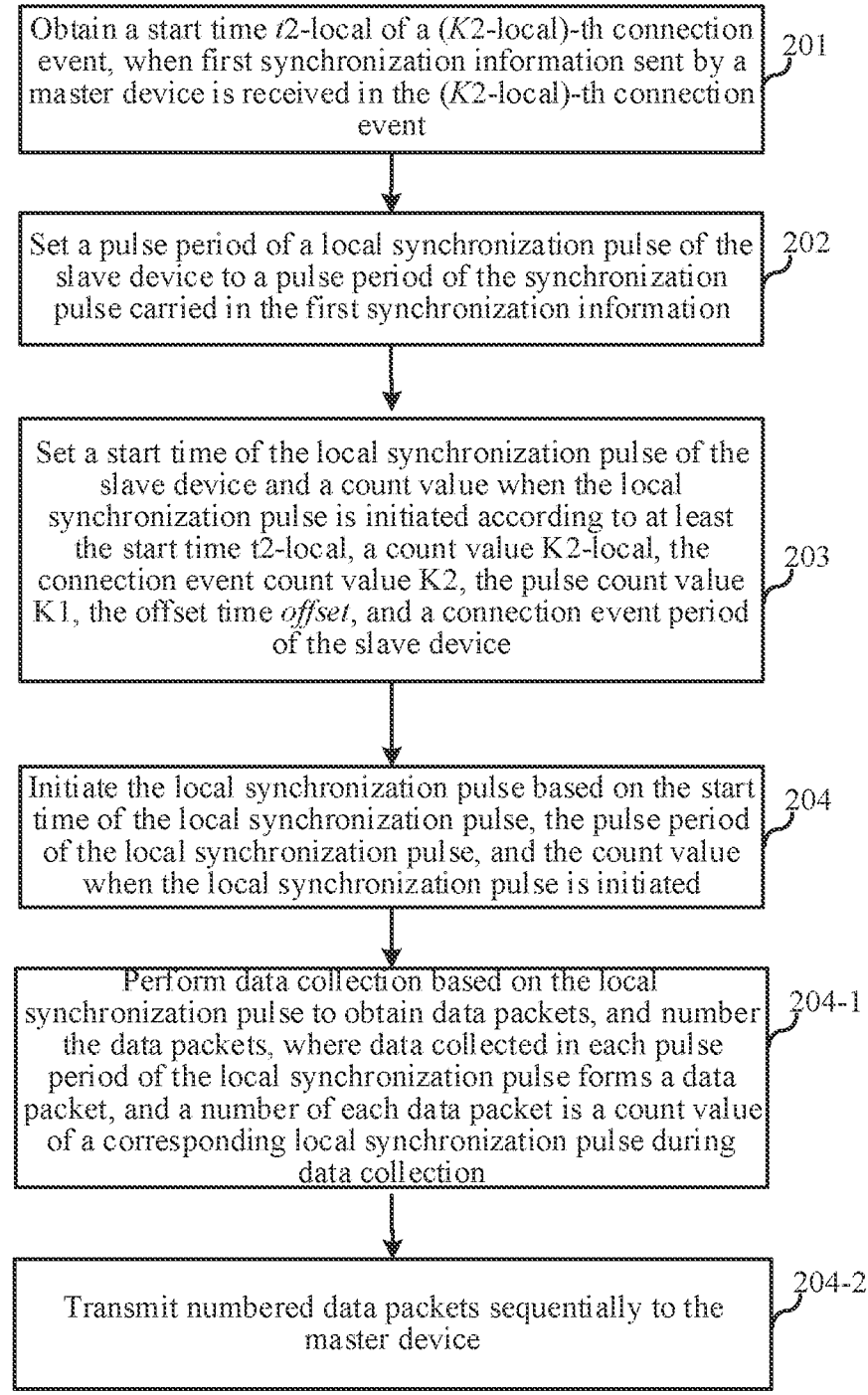
FIG. 6B is a flow chart illustrating another example of a method for establishing synchronization relationship performed by a slave device according to embodiments of the disclosure.

In one possible embodiment, when a data transmission error occurs between a slave device and a master device, for example, when a data packet is lost or even several consecutive data packets are lost, if the master device still fuses the data packets according to the receiving sequence of the data packets received by each slave device, data that are not correlated may be fused together. In view of the above, as illustrated in FIG. 6B, after initiating the local synchronization pulse according to the start time of the local synchronization pulse, the pulse period of the local synchronization pulse, and the count value at the beginning of initiation of the local synchronization pulse, the slave device further performs following operations.

At 204-1, data collection is carried out based on the local synchronization pulse to obtain data packets, and the data packets are numbered, where data collected in each pulse period of the local synchronization pulse forms a data packet, and a number of each data packet is a count value of a corresponding local synchronization pulse during data collection.

At 204-2, numbered data packets are sequentially sent to the master device.

In this case, the number of the data packet collected by each slave device at a same time point are the same. After receiving the data packets uploaded by each slave device, the master device can fuse the data packets that have correlation and are collected at the same time based on the number of each data packet. Even if individual slave device loses data packets in wireless transmission or fail to complete data collection in a certain time period due to its own problems, the master device can filter data packets that can be fused according to the number of each received data packet, so that the data fusion is more accurate. The pulse period of the synchronization pulse of the master device can be set according to the data collection period of each slave device, so that the pulse period of the local synchronization pulse initiated by each slave device meets the demand of the data collection period. Moreover, because the synchronization pulse is an independent pulse signal initiated based on the local clock and is not affected by the connection event between the master and slave devices, the designer can set the specific value of the pulse period of the synchronization pulse according to the actual scenario without being limited by the period of the connection event between the master and slave devices. Taking BLE connection as an example, the BLE connection event period is 1.25 ms*N (6<N<3200). Therefore, if the pulse period for synchronization is set to 12 ms, 5 ms, 5000 ms, etc., the pulse period for synchronization is limited by the connection event period and cannot be realized. However, in the disclosure, any synchronization period can be realized by realizing synchronization based on the synchronization pulse.

After the synchronization relationship is established between the master and slave devices, the connection between the master and slave devices can be disconnected. Specifically, the master device can actively disconnect the connection between the master and slave devices, or the slave device can actively disconnect the connection between them. Since the local synchronization pulse inside the slave device and the synchronization pulse inside the master device are still in progress (i.e., the local synchronization pulse and the synchronization pulse each is initiated according to the pulse period), the synchronization relationship between the master and slave devices can still be maintained. As in the above ECG acquisition scenario, after a connection between a slave device and the master device is disconnected, the slave device can still perform data sampling and numbering on data packets based on the local synchronization pulse. After a period of time is passed, the slave device can be connected with the master device again to upload the collected and numbered data packets. In other words, the collected data packets do not need to be uploaded in real time, and the master device can still identify the data packets that have correlation in time for fusion based on the number of each data packet.

As described above, in the disclosure, the slave device maintains a synchronous relationship with the master device in the form of the local synchronization pulse, even if the connection between the master and slave devices is disconnected, the synchronous relationship is still maintained. Therefore, in the case that the master device and the plurality of slave devices all maintain a synchronous relationship, there is no need for the master device to maintain connection with the plurality of slave devices at the same time. When the slave device initiates the local synchronization pulse, the connection between the master and slave devices is disconnected, thus saving the power consumption of both parties and link overhead. In addition, in the disclosure, since the master and slave devices keep synchronous relationship, the plurality of slave devices that need to be synchronized with the master device do not need to be connected with the master device at the same time, and the connection between the master and slave devices can be disconnected and the synchronization relationship between the master and slave devices is still maintained as long as the synchronization relationship is established. Therefore, the amount of slave devices that can be synchronized with the master device is not limited by the network bandwidth.

In the method for establishing synchronization relationship performed by the master device, after operations at 103, if the transmission of the first synchronization information fails, the master device performs a retransmitting operation, where the retransmitting operation can be performed in a following first manner or second manner.

Figure 7A:
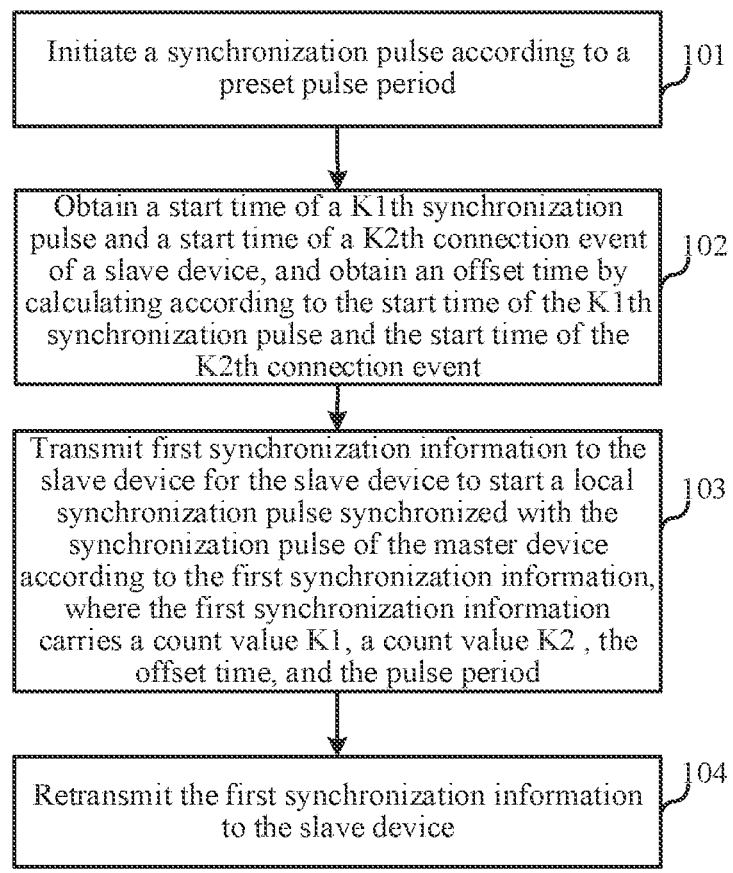
FIG. 7A is a flow chart illustrating an example of a method for establishing synchronization relationship including a re-transmitting operation performed by a master device according to embodiments of the disclosure.

FIG. 7A illustrates that the retransmitting operation is implemented in the first manner. After operations at 103, if the transmission of the first synchronization information fails, the retransmitting operation implemented in the first manner (corresponding to an operation at 104) is further conducted. Specifically, the first synchronization information is retransmitted to the slave device. That is, when the master device executes the retransmitting operation in the first manner, the master device still transmits the first synchronization information. Operations at 101 to 103 in FIG. 7A are consistent with those in FIG. 1 and are not described herein again.

For the slave device, after the first synchronization information retransmitted by the master device is received, operations for the slave device to calculate the relevant parameters for initiating the local synchronization pulse are the same as the example shown in FIG. 4, which are not repeated here.

After the master device executes the retransmitting operation in the first manner, if the slave device still does not receive the first synchronization information, the master device can execute the retransmitting operation several times until the slave device receives the first synchronization information. However, no matter in which retransmitting operation the first synchronization information is received by the slave device, the specific operations for the slave device to calculate the relevant parameters for initiating the local synchronization pulse based on the first synchronization information are similar.

Figure 7B:
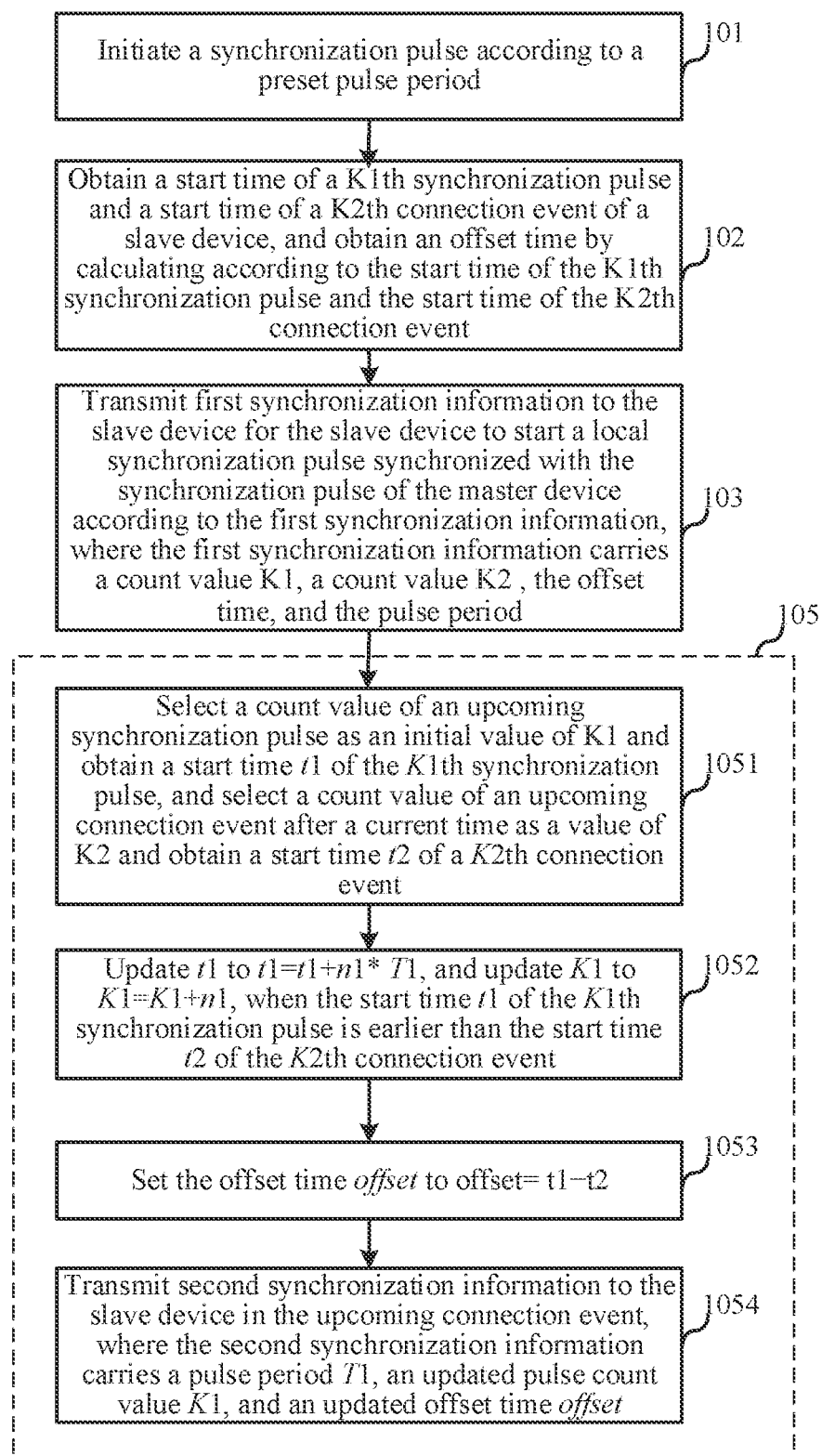
FIG. 7B is a flow chart illustrating another example of a method for establishing synchronization relationship including a re-transmitting operation performed by a master device according to embodiments of the disclosure.

FIG. 7B illustrates that the operation is implemented in the second manner. After operations at 103, if the transmission of the first synchronization information fails, retransmitting operation implemented in the second manner (corresponding to an operation at 105) is further conducted. Specifically, the operations at 105 are implemented as follows.

At 1051, a count value of an upcoming synchronization pulse is selected as an initial value of K1 and a start time t1 of the K1th synchronization pulse is obtained, and a count value of an upcoming connection event after a current time is selected as a value of K2 and a start time t2 of a K2th connection event is obtained.

At 1052, when the start time t1 of the K1th synchronization pulse is earlier than the start time t2 of the K2th connection event, t1 is updated to t1=t1+n1*T1, and K1 is updated to K1=K1+n1, where T1 is a pulse period of the synchronization pulse, and n1 is a positive integer to make an updated t1 later than t2.

Further, n1 may be the minimum positive integer to make the updated t1 later than t2.

At 1053, the offset time offset is set to t1−t2, i.e., offset=t1−t2.

At 1054, second synchronization information is transmitted to the slave device in the upcoming connection event, where the second synchronization information carries a pulse period T1, an updated pulse count value K1, and an updated offset time offset.

The above operations at 1051 to 1053 are consistent with the above operations 1021 to 1023, in order to obtain a start time and a count value of a recent future pulse and a corresponding offset time offset, which are not repeated herein.

Figure 8:
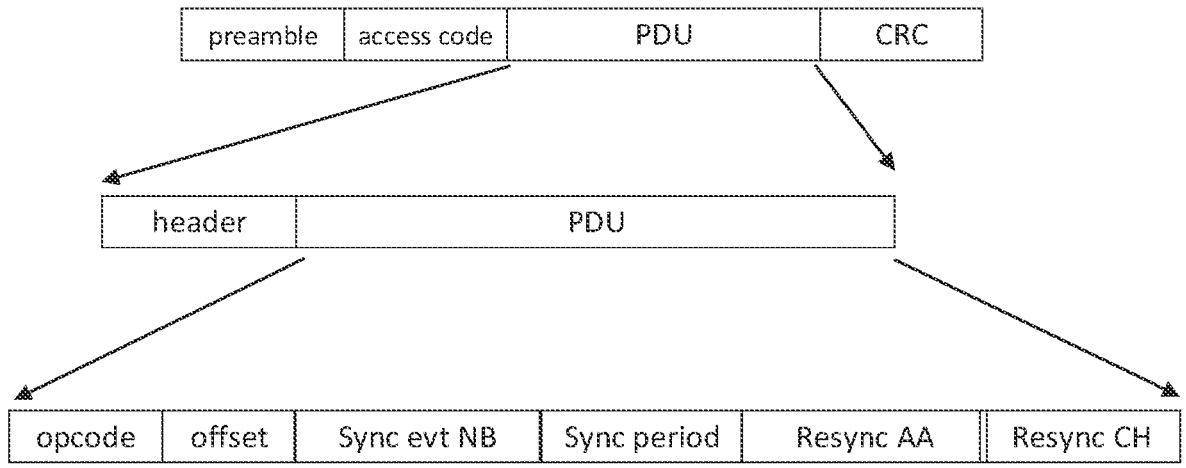
FIG. 8 is a schematic diagram illustrating a data format of second synchronization information according to embodiments of the disclosure.

The second synchronization information is transmitted in a data format supported by the wireless connection mode between the master device and the slave device. For example, in the BLE technology, the data format of the second synchronization information is illustrated in FIG. 8. The data format of the second synchronization information includes a preamble, an access code, a protocol data unit (PDU), and a cyclic redundancy check (CRC). The pulse count value K1, the offset time offset, and the pulse period T1 are carried in the PDU. As illustrated in FIG. 8, the PDU includes a plurality of fields. Specifically, the offset field is used to carry the offset time offset, the Sync evt NB field is used to carry pulse count value K1, the Sync period field is used to carry the pulse period T1, and the Resync AA field and the Resync CH field are respectively used to carry an access code and a channel identification in a next synchronization. The PDU in FIG. 8 has no BLE Evt NB field compared to the PDU in FIG. 5.

Figure 9:
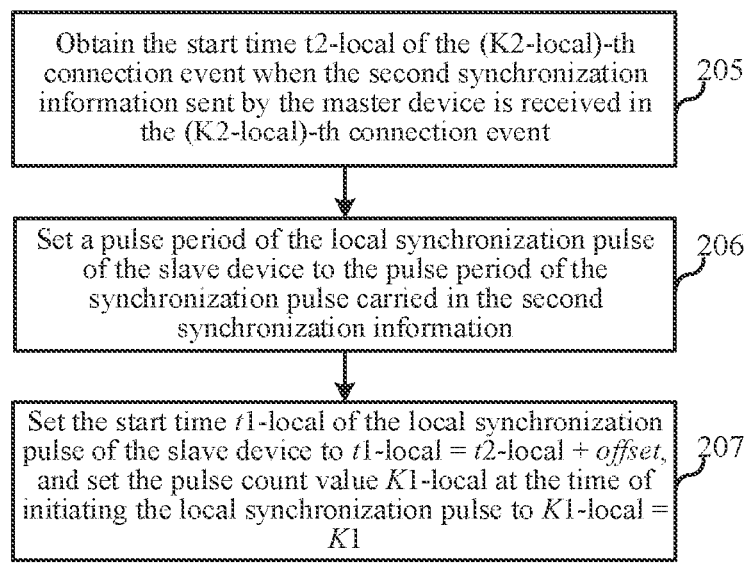
FIG. 9 is a flow chart illustrating an example in which a local synchronization pulse is initiated by a slave device according to received second synchronization information according to embodiments of the disclosure.

Correspondingly, as illustrated in FIG. 9, in the method for establishing synchronization relationship executed by the slave device, the method further includes following operations.

At 205, when the second synchronization information sent by the master device is received in the (K2-local)-th connection event, the start time t2-local of the (K2-local)-th connection event is obtained.

The second synchronization information carries a count value K1 of the synchronization pulse of the master device, an offset time offset, and a pulse period of the synchronization pulse. The offset time offset is a difference between a start time t1 of a K1th synchronization pulse and a start time t2 of a K2th connection event recorded by the master device, where t1 is later than t2.

At 206, a pulse period of the local synchronization pulse of the slave device is set to the pulse period of the synchronization pulse carried in the second synchronization information.

At 207, the start time t1-local of the local synchronization pulse of the slave device is set to t1-local=t2-local+offset, and the pulse count value K1-local at the time of initiating the local synchronization pulse is set to K1-local=K1.

Generally, the master device executes the retransmitting operation only after transmission of the first synchronization information fails. In the retransmitting operation implemented in the second manner, the master device sends the second synchronization information. In other words, in the second manner, the slave device receives the second synchronization information and perform synchronizing based on the second synchronization information, which also indicates that the slave device has not been able to successfully receive the first synchronization information.

In operations at 1054, compared to the first synchronization information, data carried in the second synchronization information has no connection event count value K2. The reason is that in operations at 1051 to 1053 related to the retransmitting operation, the reference of the offset time offset is the start time of the upcoming connection event, and the second synchronization information is also sent to the slave device in the upcoming connection event. For the slave device, the start time of the upcoming connection event is the start time of the connection event in which the second synchronization information is received, that is, the count value K2-local of the connection event when the second synchronization information is received by the slave device is equal to K2. Therefore, the slave device can obtain the start time t1-local of the local synchronization pulse by calculating according to t1-local=t2-local+offset, and thus no K2 is needed. In another example, the slave device can still obtain the start time t1-local of the local synchronization pulse based on t1-local=t2-local-(K2-local−K2)*T0+offset. As mentioned above, in the retransmitting process, since K2-local is equal to K2, the item (K2-local−K2)*T0 equals 0, and thus the start time t1-local of the local synchronization pulse is still obtained according to t1-local=t2-local+offset.

After the master device executes the retransmitting operation in the second manner, if the slave device still does not receive the second synchronization information, the master device can execute the retransmitting operation several times until the slave device receives the second synchronization information. However, no matter in which retransmission the second synchronization information is received by the slave device, the specific operations for the slave device to calculate the relevant parameters for initiating the local synchronization pulse based on the second synchronization information are similar.

The foregoing describes two specific manners of implementing the retransmitting operation by the master device, where in the retransmitting operation implemented in the second manner, for the master device, the second synchronization information carries relatively less data, and for the slave device, less computation is required to calculate the relevant parameters for initiating the local synchronization pulse.

The master device can actively disconnect from the slave device after successfully transmitting the first synchronization information or the second synchronization information. Alternatively, the slave device can actively disconnect from the master device after successfully receiving the first synchronization information or the second synchronization information. In this way, energy consumption of both parties and link overhead can be saved. However, due to the existence of the PPM, even if the local synchronization pulse in the slave device is still maintained, the synchronization deviation between the master and slave devices gradually accumulates after a period of time. If the accumulated deviation is too large, the synchronization between the master and slave devices may be relatively poor, which may not meet the needs of scenarios. In this case, the slave device needs to resynchronize with the master device. After the connection between the master and slave device is disconnected, the master and slave devices can start a resynchronization process regularly to resynchronize regularly and eliminate the synchronization deviation caused by time accumulation regularly. Moreover, after each initiating, the resynchronization process can last for a preset duration, so that the slave device has enough time to accurately receive third synchronization information sent in the resynchronization process and realize resynchronization.

Figure 10:
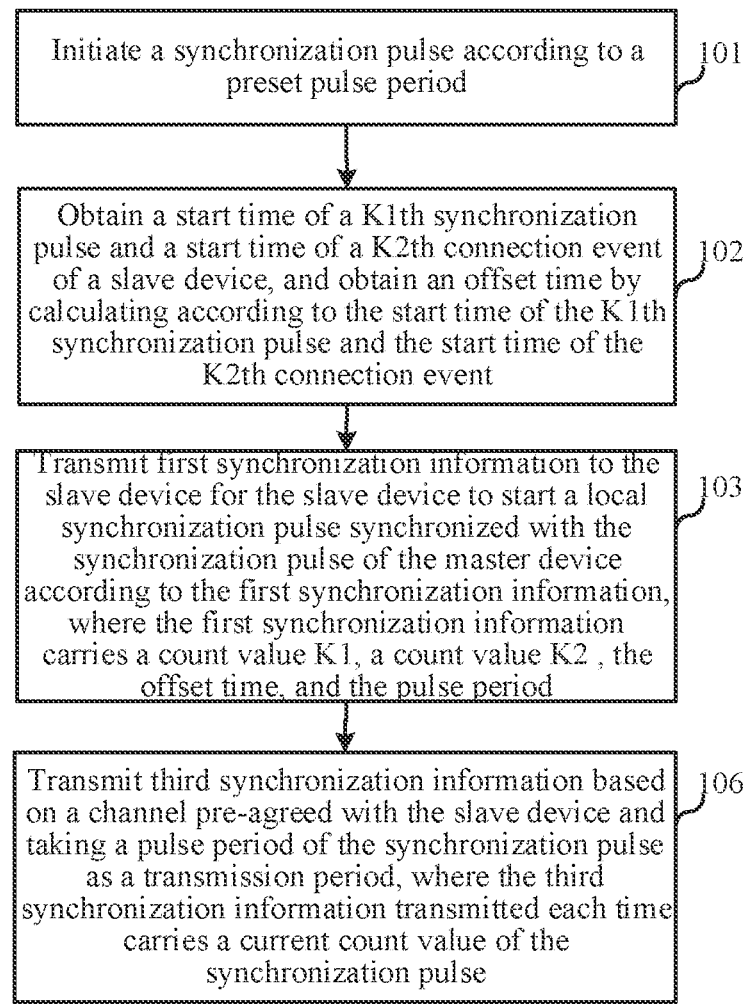
FIG. 10 is a flow chart illustrating an example of a resynchronization process performed by a master device according to embodiments of the disclosure.

FIG. 10 is a flow chart of a resynchronization process performed by a master device according to embodiments of the disclosure. That is, after operation at 103 is executed, operations at 106 (corresponding to the resynchronization process) is further conducted.

At 106, third synchronization information is transmitted based on a channel pre-agreed with the slave device and by taking a pulse period of a synchronization pulse as a transmission period, where the third synchronization information transmitted each time carries a current count value of the synchronization pulse.

The third synchronization information may also carry a pulse period of the synchronization pulse so that the slave device uses the pulse period carried in the third synchronization information as a pulse period of the local synchronization pulse when resynchronizing. In this way, when the pulse period of the synchronization pulse of the master device changes, the updated pulse period can be acquired timely and accurately by the slave device.

The channel pre-agreed with the slave device can be sent to the slave device by the master device in advance, such as being carried in the first synchronization information or the second synchronization information mentioned above to be sent to the slave device. In addition, an access code for authentication can also be carried in the first synchronization information or the second synchronization information mentioned above to be sent to the slave device.

The channel pre-agreed with the slave device may also be a broadcast channel, i.e., the master device transmits the third synchronization information in a broadcast manner. The broadcast channel may be a broadcast channel supported by a transport protocol used for communication between the master and slave devices.

Figure 11:
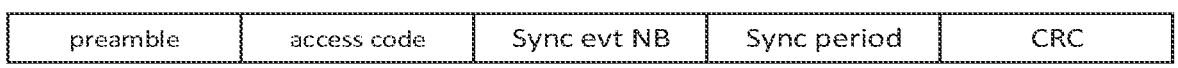
FIG. 11 is a schematic diagram illustrating a data format of third synchronization information according to embodiments of the disclosure.

The third synchronization information is encapsulated into a data format supported by the transmission protocol for transmission. In the BLE technology, the data format of the third synchronization information may be similar to the data format of the BLE data packet. As illustrated in FIG. 11, the data format includes at least a preamble field, an access code field, a Sync evt NB field, a Sync period field, and a CRC field. The Sync evt NB field is used to carry the count value K1 of the synchronization pulse. Further, when the third synchronization information carries the pulse period T1, the data format further includes a Sync period field for carrying the pulse period T1.

FIG. 10 is just an example. If the first synchronization information is transmitted successfully, operations at 106 may be executed after operations at 103. If transmission of the first synchronization information fails, operations at 106 may be executed after operations at 104 or operations at 105.

Figure 12:
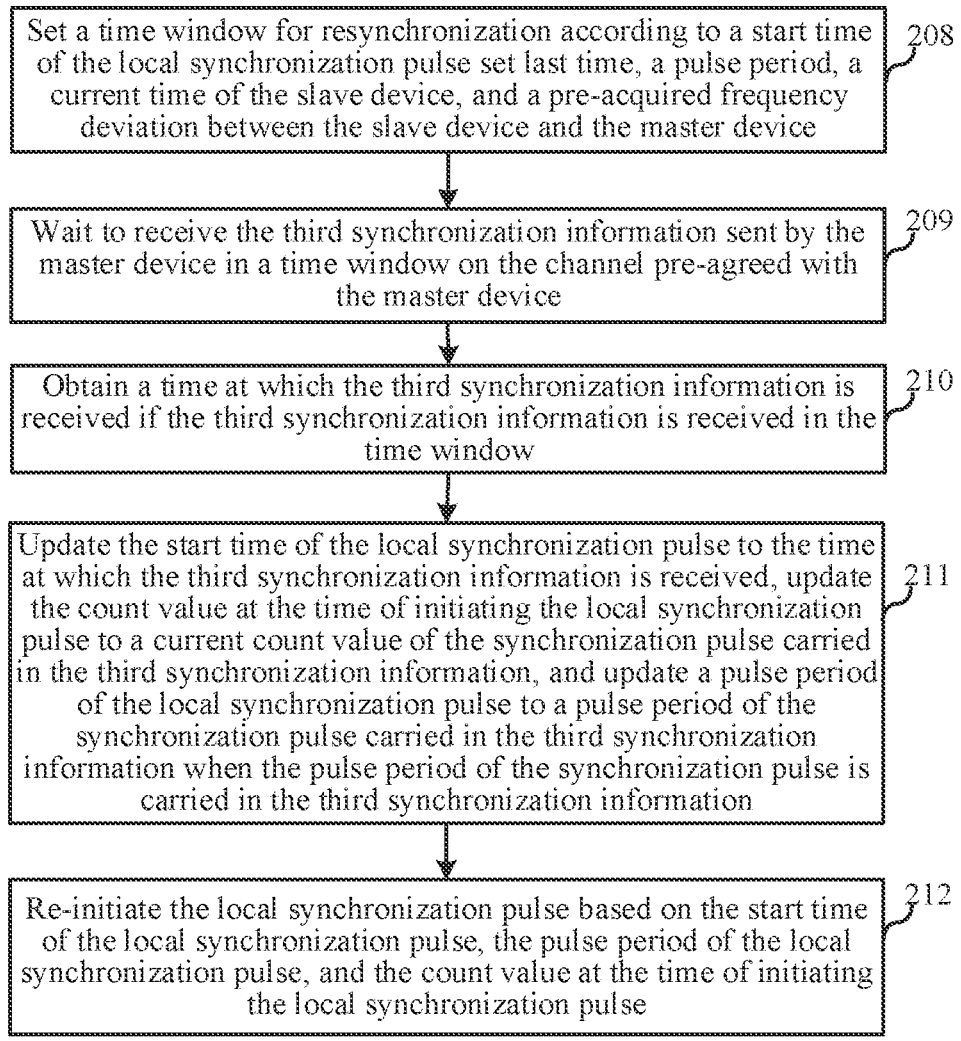
FIG. 12 is a flow chart illustrating an embodiment of re-establishing a synchronization relationship with a master device performed by a slave device according to embodiments of the disclosure.

FIG. 12 illustrates a method executed by the slave device. The slave device starts a resynchronization process. The slave device can also start the resynchronization process regularly. The resynchronization process may be performed as follows.

At 208, a time window for resynchronization is set according to a start time of the local synchronization pulse set last time, a pulse period, a current time of the slave device, and a pre-acquired frequency deviation between the slave device and the master device.

Figure 13:
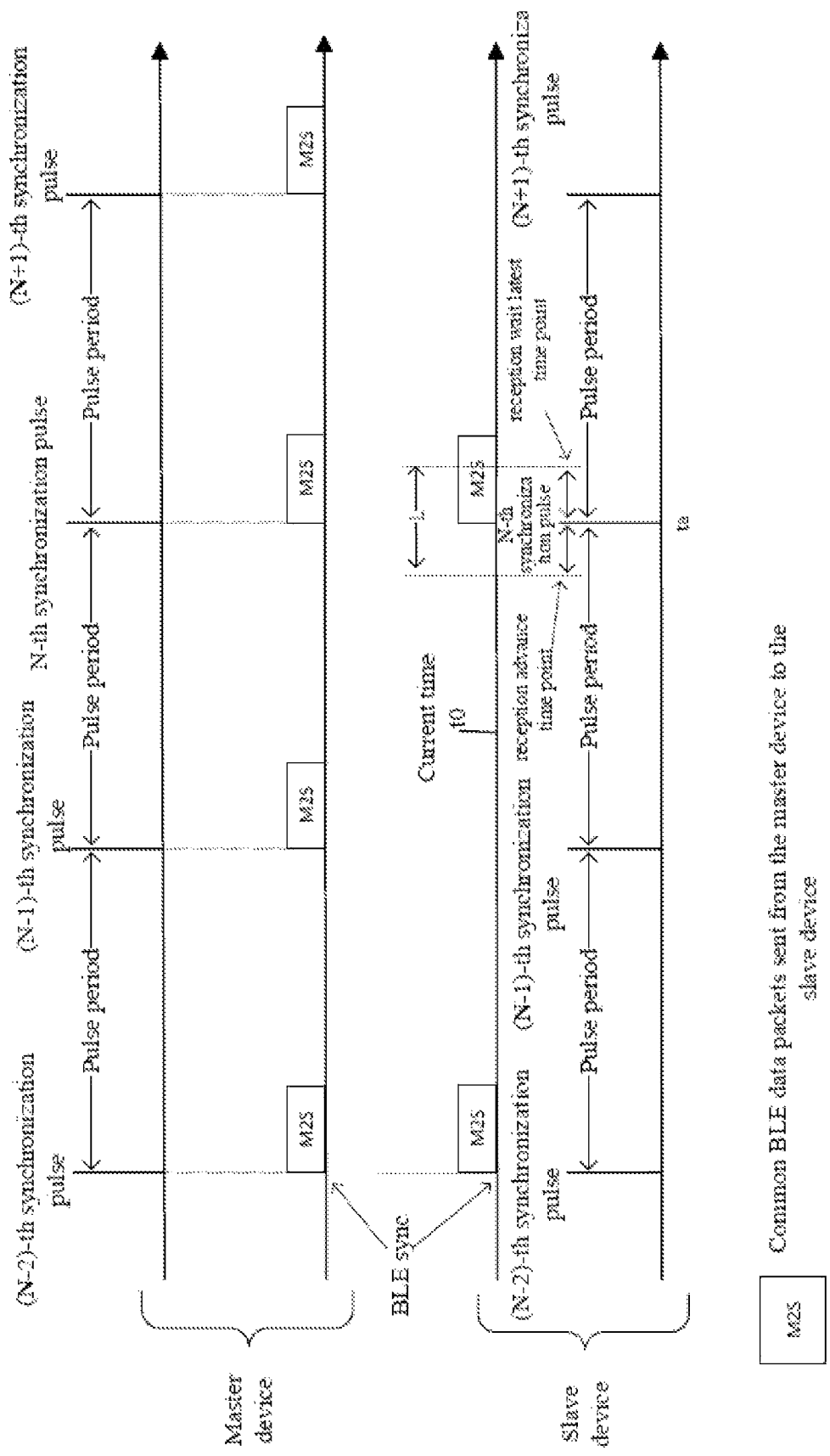
FIG. 13 is a schematic diagram of setting a time window when a slave device receives the third synchronization information broadcast by a master device according to embodiments of the disclosure.

Specifically, the slave device determines a length L of the time window as: L=(t0−t1-local)*PPM/1000000, and a time center point ta of the time window as: ta=t1-local+n4*T1, where PPM represents the frequency deviation, t0 represents a current time of the slave device, and n4 is an integer to make ta later than the current time t0 of the slave device. As illustrated in FIG. 13, the current time t0 is between a start time of a (N−1)-th synchronization pulse and the start time of the N-th synchronization pulse and the time center point ta is determined as the start time of the N-th synchronization pulse. For example, if the start time t1-local of the local synchronization pulse set last time is the start time of the (N−15)-th synchronization pulse, a value of n4 in ta=t1-local+n4*T1 is 15, such that the calculated time center point ta is later than the current time t0. In this example, the value of n4 equals 15, which is a minimum integer value to make the time center point ta later than the current time t0 of the slave device. Optionally, n4 can also be an integer greater than or equal to 16. A time length between a reception advance time point and a reception wait latest time point illustrated in FIG. 13 is the length L of the time window.

At 209, the slave device waits to receive the third synchronization information sent by the master device in a time window on the channel pre-agreed with the master device, where a transmission period of the third synchronization information is the same as the pulse period of the synchronization pulse of the master device, and the third synchronization information carries a current count value of the synchronization pulse.

At 210, if the third synchronization information is received in the time window, a time at which the third synchronization information is received is obtained.

Specifically, the third synchronization information is sent to the slave device in the form of a data packet supported in the current wireless connection. For example, in the BLE technology, a data packet format supported by the BLE includes a preamble and an access code. When verification of the preamble and the access code in the data packet by the slave device is passed, it means that the data packet is allowed to be received, and then the protocol data unit (PDU) in the data packet is obtained, where the PDU carries the pulse count value. The preamble and the access code can be understood as identifiers of the data packet.

The slave device verifies the third synchronization information. If the verification passes, the third synchronization information is allowed to be received, and the slave device records a time at which verification of the third synchronization information is passed. The slave device obtains the time at which the third synchronization information is received according to the time at which verification of the third synchronization information is passed and a verification time length preset in the slave device. The slave device verifying the third synchronization information means matching the identifiers of the data packet. If the matching is successful, it indicates that the verification is passed.

It can be understood that it takes time to verify the identifiers, that is, there is a time difference between the time at which the third synchronization information is successfully received and the time at which the third synchronization information is just received. The time difference is a time consumed for verification of the identifiers, which is related to the configuration of the port physical layer. That is, an estimated time difference can be preset by the slave device as the time length consumed for verification of the identifiers. Therefore, the time at which the third synchronization information is actually received can be obtained by subtracting the preset verification time length from the time at which verification of the recorded third synchronization information is passed. The time at which the third synchronization information is received determined in this way is more accurate, thereby making the synchronization between the master and slave devices better.

At 211, the start time of the local synchronization pulse is updated to the time at which the third synchronization information is received, the count value at the time of initiating the local synchronization pulse is updated to a current count value of the synchronization pulse carried in the third synchronization information, and a pulse period of the local synchronization pulse is updated to a pulse period of the synchronization pulse carried in the third synchronization information when the pulse period of the synchronization pulse is carried in the third synchronization information.

Since the count value M1 carried in the third synchronization information sent by the master device is the count value of the latest synchronization pulse and the transmission time can be ignored, for the slave device, the time at which the third synchronization information is received is considered to be the start time of the M1st synchronization pulse of the master device. Therefore, the slave device sets the start time t1-local of the local synchronization pulse to the time at which the third synchronization information is received, and sets M1 carried in the third synchronization information as the count value K1-local at the time of initiating the local synchronization pulse.

The third synchronization information transmitted by the master device further includes the pulse period T1 of the synchronization pulse, so that the slave device can directly set the pulse period of the local synchronization pulse to T1. If the third synchronization information does not carry the pulse period T1 of the synchronization pulse, the slave device may receive the third synchronization information several times to determine a broadcast period of the third synchronization information, so as to directly set the pulse period of the local synchronization pulse to the broadcast period.

At 212, the local synchronization pulse is re-initiated based on the start time of the local synchronization pulse, the pulse period of the local synchronization pulse, and the count value at the time of initiating the local synchronization pulse.

Therefore, the slave device can reset relevant parameters for initiating the local synchronization pulse according to the third synchronization information broadcast by the master device, and start the local synchronization pulse based on the reset relevant parameters, so as to overcome the problem that the synchronization accuracy after a long time caused by the accumulated error due to the PPM is reduced.

In one embodiment of the method for establishing synchronization relationship of the disclosure, the third synchronization information sent by the master device can be independently used to establish the synchronization relationship between the master device and the slave device.

Figure 14:
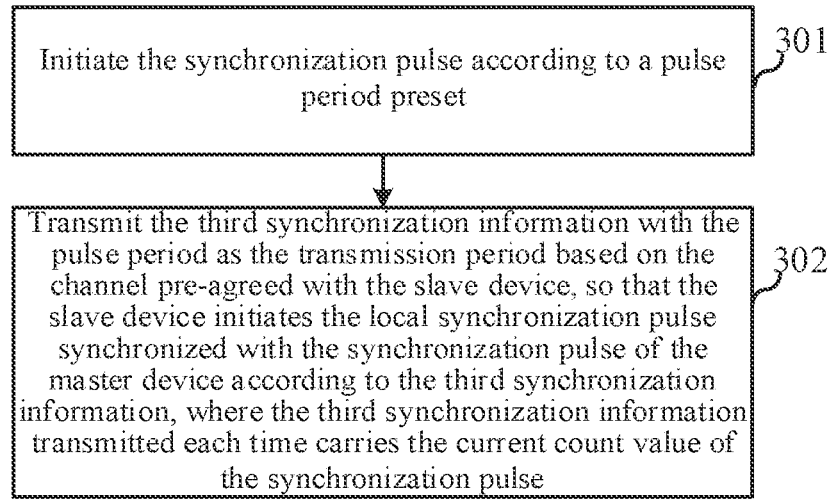
FIG. 14 is a flow chart illustrating another example of a method for establishing synchronization relationship performed by a master device according to embodiments of the disclosure.

The method is performed by the master device. As illustrated in FIG. 14, the method includes the following.

At 301, the synchronization pulse of the master device is initiated according to a pulse period preset.

At 302, the third synchronization information is transmitted with the pulse period as the transmission period based on the channel pre-agreed with the slave device, so that the slave device initiates the local synchronization pulse synchronized with the synchronization pulse of the master device according to the third synchronization information, where the third synchronization information transmitted each time carries the current count value of the synchronization pulse.

The specific implementation of operations at 301 is similar to that of operations at 101, which are not described herein.

At 302, the third synchronization information may also carry the pulse period of the synchronization pulse.

The channel pre-agreed with the slave device can be pre-configured in the master device and the slave device by the designer. Alternatively, the channel pre-agreed with the slave device can be calculated by the master device or the slave device based on a preset algorithm, or can be agreed by information interaction in a wired or wireless way in advance. If both the master and slave devices have the near field communication (NFC) function, the channel pre-agreed with the slave device can be obtained by exchanging information through the NFC function. There is no restriction on a pre-agreed manner of the channel. In addition, the access code for authentication required when receiving the third synchronization information can also be obtained in a manner pre-agreed by the master and slave devices, which are similar to the pre-agreed way of the channel, and are not described in detail.

The channel pre-agreed with the slave device may also be a broadcast channel, i.e., the master device transmits the third synchronization information in a broadcast manner. The broadcast channel may be a broadcast channel supported by a transport protocol used for communication between the master and slave devices.

Figure 15:
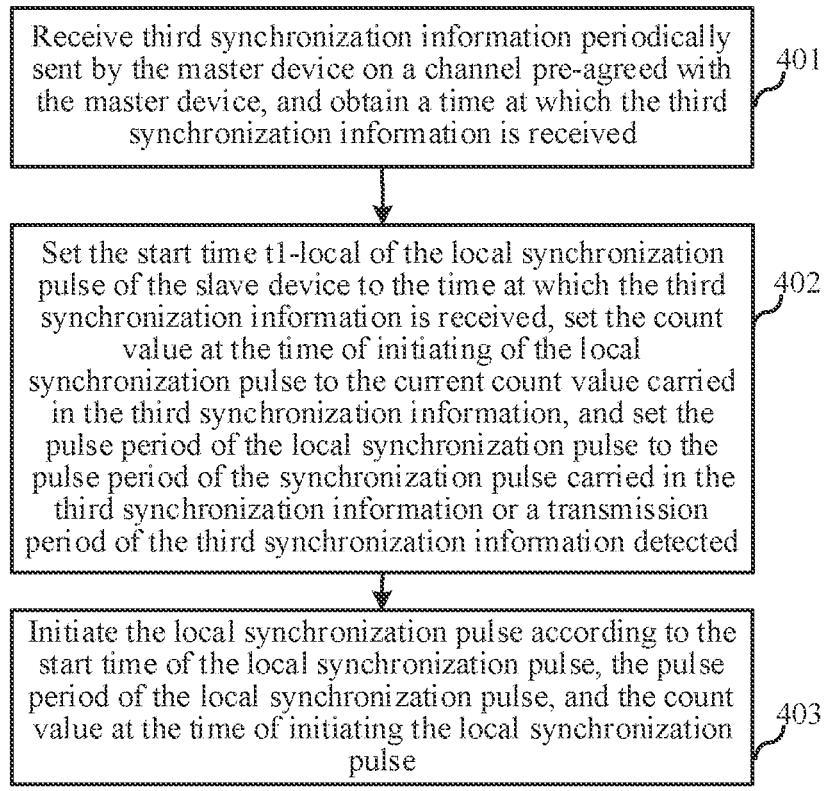
FIG. 15 is a flow chart illustrating yet another example of a method for establishing synchronization relationship performed by a slave device according to embodiments of the disclosure.

Corresponding to the method for establishing synchronization relationship executed by the master device illustrated in FIG. 14, the method for establishing synchronization relationship executed by the slave device as illustrated in FIG. 15a includes the following operations.

At 401, third synchronization information periodically sent by the master device is received on a channel pre-agreed with the master device, and a time at which the third synchronization information is received is obtained, where a transmission period of the third synchronization information is the same as a pulse period of the synchronization pulse of the master device, and the third synchronization information carries a current count value of the synchronization pulse.

Specifically, the slave device sets a time window and waits to receive the third synchronization information within the time window. The length of the time window is required to cover a maximum possible length of the pulse period of the synchronization pulse, which can be set as required. For example, the designer can estimate the possible range of the pulse period of the synchronization pulse in a specific application scenario, and then preset the length of the time window to be greater than an upper limit of the possible range of the pulse period, thus ensuring that the third synchronization information can be received.

The slave device receiving the third synchronization information can be understood as verifying the third synchronization information, and allowing the third synchronization information to be received if the verification is successful. Generally, the slave device may record a time at which the verification is successful and determine the time at which the verification is successful as the time when the third synchronization information is received. However, in fact, it also takes time to verify the third synchronization information, and there is a time difference between the time at which the third synchronization information is received obtained in operations at 401, i.e., the time at which the third synchronization information is successfully received and the time at which the third synchronization information is just received, and the time difference is the time consumed for verification of the identifiers, which is related to the configuration of the port physical layer. That is, an estimated time difference can be preset by the slave device as the time length consumed for the verification of the identifiers. Therefore, the time at which the third synchronization information is actually received can be obtained by subtracting a preset verification time length from the time at which the verification of the recorded third synchronization information is passed. The specific implementation of the verification of the third synchronization information is similar to the verification of the third synchronization information mentioned in operations at 210 and are not be described here. In this way, the time at which the third synchronization information is received determined is more accurate, thereby making the synchronization of the master and slave devices better.

At 402, the start time t1-local of the local synchronization pulse of the slave device is set to the time at which the third synchronization information is received, the count value at the time of initiating of the local synchronization pulse is set to the current count value carried in the third synchronization information, and the pulse period of the local synchronization pulse is set to the pulse period of the synchronization pulse carried in the third synchronization information or a transmission period of the third synchronization information detected.

In one example, when the third synchronization information carries the pulse period of the synchronization pulse of the master device, the slave device can set the pulse period of the local synchronization pulse to the pulse period of the synchronization pulse carried in the third synchronization information, thereby directly and accurately setting the pulse period of the local synchronization pulse. When the third synchronization information does not carry the pulse period of the synchronization pulse, the slave device can detect the transmission period of the third synchronization information and set the pulse period of the local synchronization pulse to the detected transmission period of the third synchronization information. Specifically, the slave device can set the length of the time window to be larger, in order to continuously wait for receiving a plurality of third synchronization pulses, and determines the pulse period according to the time point at which each third synchronization pulse is received. For example, the slave device can determine a receiving time difference of a group of adjacent third synchronization pulses (i.e., a difference between a time at which a third synchronization pulse is received and an adjacent third synchronization pulse is received) as the pulse period. Alternatively, the slave device can determine an average value of a receiving time differences of each of a plurality of groups of adjacent third synchronization pulses as the pulse period.

At 403, the local synchronization pulse is initiated according to the start time of the local synchronization pulse, the pulse period of the local synchronization pulse, and the count value at the time of initiating the local synchronization pulse.

In one example, as illustrated in the figure, after operations at 403, the slave side also performs the following two operations. Data collection is carried out based on the local synchronization pulse to obtain data packets, and each data packet is numbered. Data collected in each pulse period of the local synchronization pulse forms a data packet, and a number of each data packet is a count value of a corresponding local synchronization pulse during data collection. Thereafter, numbered data packets are sequentially sent to the master device. The two operations are implemented in the same manner as operations at 204-1 and 204-2 in FIG. 6B and are not repeated here.

In some embodiments, a method for establishing synchronization relationship is provided. The method is applicable to a master device and includes following operations. A synchronization pulse is initiated according to a pulse period preset. Third synchronization information is transmitted according to a channel pre-agreed with a slave device and by taking the pulse period as a transmission period, whereby the slave device initiates a local synchronization pulse synchronized with the synchronization pulse of the master device according to the third synchronization information; where the third synchronization information transmitted each time carries a current count value of the synchronization pulse.

In some embodiments, the third synchronization information further carries the pulse period of the synchronization pulse.

In some embodiments, the channel pre-agreed with the slave device is a broadcast channel.

In some embodiments, a method for establishing synchronization relationship is provided. The method is applied to the slave device and includes the following. Third synchronization information periodically transmitted by a master device on a channel pre-agreed with the master device is received, and a time at which the third synchronization information is received is obtained; where a transmission period of the third synchronization information is the same as a pulse period of a synchronization pulse of the master device, and the third synchronization information carries a current count value of the synchronization pulse. A start time of a local synchronization pulse of the slave device is set to the time at which the third synchronization information is received, a count value at start of the local synchronization pulse is set to the current count value carried in the third synchronization information, and a pulse period of the local synchronization pulse is set to the pulse period of the synchronization pulse carried in the third synchronization information or the transmission period of the third synchronization information. The local synchronization pulse is initiated according to the start time of the local synchronization pulse, the pulse period of the local synchronization pulse, and the count value at the start of the local synchronization pulse.

In some embodiments, the method further includes the following. The pulse period of the local synchronization pulse is set to the pulse period of the synchronization pulse carried in the third synchronization information, in response to the pulse period of the synchronization pulse being carried in the third synchronization information.

In some embodiments, the method further includes the following after initiating the local synchronization pulse according to the start time of the local synchronization pulse, the pulse period of the local synchronization pulse, and the count value at the start of the local synchronization pulse. Data collection is performed based on the local synchronization pulse to obtain data packets, and renumbering the data packets; wherein data collected in each pulse period of the local synchronization pulse forms a data packet, and a number of each data packet is a corresponding count value of the local synchronization pulse during the data collection. Numbered data packets are transmitted to the master device sequentially.

Division of operations in the above methods is directed to facilitate clear description. The operations may be combined into one operation or some operations may be separated into a plurality of operations, which are included in the protection scope of the present disclosure as long as the same logic relationships are involved. Any trivial modification or design added to the algorithms or processes that does not change the algorithms or processes of the core design of the present disclosure is included in the protection scope of the present disclosure.

Figure 16:
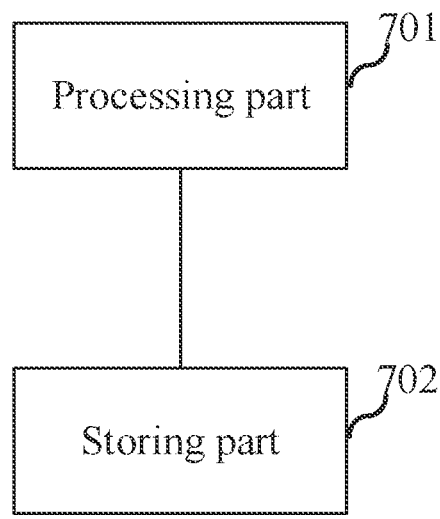
FIG. 16 is a schematic structural diagram illustrating a chip according to embodiments of the disclosure.

An embodiment of the disclosure provides a chip. As shown in FIG. 16, the chip includes a processing part 701 and a storing part 702. The storing part 702 stores an instruction executable by the processing part 701. The instruction is executed by the processing part 701, to implement the above method embodiments. The chip may serve as a master device or a slave device.

Figure 17:
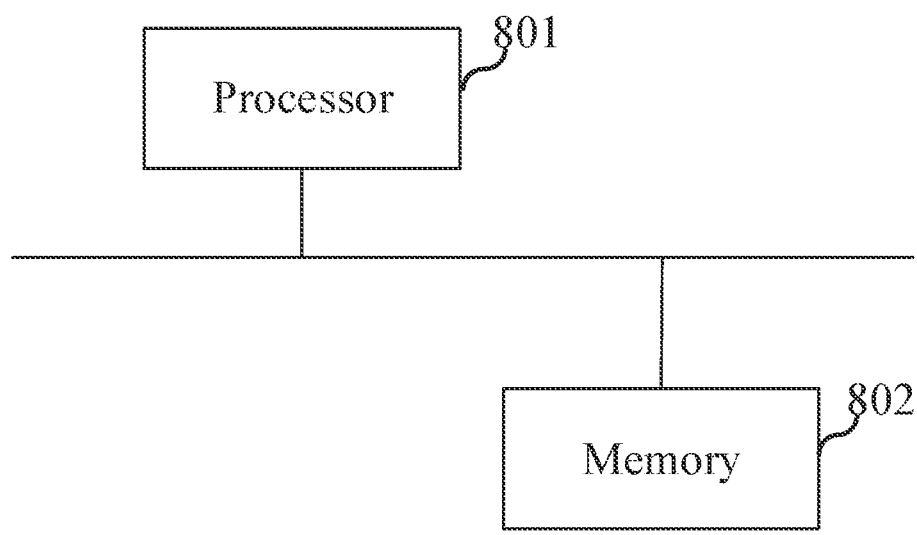
FIG. 17 is a schematic structural diagram illustrating an electronic device according to embodiments of the disclosure.

An embodiment of the present disclosure further provides an electronic device. As shown in FIG. 17, the electronic device includes at least one processor 801, and a memory 802 in communication connection with the at least one processor 801. Herein, the memory stores an instruction executable by the at least one processor 801. The instruction, when executed by the at least one processor 801, cause the at least one processor 801 to implement the above method embodiments. The electronic device may be a master device or a slave device.

Herein, the memory 802 and the at least one processor 801 are connected through a bus. The bus may include any number of buses and bridges interconnected. The bus connects one or more processors 801 with circuits of the memory 802. The bus may further connect various other circuits such as a peripheral device, a voltage regulator and a power management circuit. These are common knowledge in the existing technology, and are not further described. A bus interface provides an interface between the bus and a transceiver. The transceiver may be one or more elements, for example, multiple receivers and transmitters that provide units for communicating with other apparatuses on a transmission medium. Data processed by the at least one processor 801 are transmitted on wireless medium through an antenna. Further, the antenna receives data and transmits the data to the at least one processor 801.

The at least one processor 801 is responsible for managing the buses and general processing, and further provides varied functions including timing, controlling a peripheral interface, adjust a voltage and power management and other control functions. The memory 802 may be used to store data used by the at least one processor 801 when in operation.

An embodiment of the present disclosure further provides a non-transitory computer-readable storage medium storing a computer program. The computer program, when executed by a processor, causes a processor to implement the method embodiments described in the above.

That is, those skilled in the art may understand that all or some operations in the method embodiments may be implemented by instructing hardware through a program. The program is stored in a storage medium. The program includes instructions that enable one device (which may be a single-chip microcomputer or a chip and the like) or processor to perform all or some operations of the methods of the embodiments. The storage medium as described above may be a medium such as a universal serial bus, a mobile hard disk, a read-only memory (ROM), a random access memory (RAM), a magnetic disk or an optical disk, that may store program codes.

Those of ordinary skill in the art may understand that the above embodiments are specific embodiments to implement the present disclosure. In practice, the embodiments may be modified in form and details without departing from the spirit and scope of the present disclosure.

What is claimed is:

1. A method for establishing synchronization relationship and applicable to a master device, the method comprising:
   initiating a synchronization pulse of the master device according to a pulse period T1 preset;
   obtaining a start time t1 of a K1th synchronization pulse and a start time t2 of a K2th connection event of a slave device, and obtaining an offset time according to the start time t1 of the K1th synchronization pulse and the start time t2 of the K2th connection event, wherein a connection between the master device and the slave device has been established; and
   transmitting first synchronization information to the slave device for the slave device to initiate a local synchronization pulse synchronized with the synchronization pulse of the master device according to the first synchronization information, wherein the first synchronization information carries a count value K1 of the K1th synchronization pulse, a count value K2 of the K2th connection event, the offset time, and the pulse period T1.

2. The method of claim 1, wherein the start time t1 of the K1th synchronization pulse is later than the start time t2 of the K2th connection event.

3. The method of claim 2, wherein obtaining the start time t1 of the K1th synchronization pulse and the start time t2 of the K2th connection event of the slave device and obtaining the offset time according to the start time t1 of the K1th synchronization pulse and the start time t2 of the K2th connection event comprises:
    selecting a count value of an upcoming synchronization pulse as an initial value of K1 and obtaining the start time t1 of the K1th synchronization pulse, and selecting a count value of an upcoming connection event as a value of K2 and obtaining the start time t2 of the K2th connection event;
    in response to the start time t1 of the K1th synchronization pulse being earlier than the start time t2 of the K2th connection event, updating the start time t1 to t1=t1+n1*T1 and updating the count value K1 to K1=K1+n1, wherein T1 represents the pulse period and n1 is a positive integer to make an updated start time t1 later than start time t2; and
    determining a time difference between the updated start time t1 and the start time t2 as the offset time.

4. The method of claim 3, wherein n1 is a minimum positive integer to make the updated start time t1 later than the start time t2.

5. The method of claim 3, wherein transmitting the first synchronization information to the slave device comprises:
    transmitting the first synchronization information to the slave device in the upcoming connection event.

6. The method of claim 3, further comprising:
    after transmitting the first synchronization information to the slave device,
    performing retransmitting in a first manner or in a second manner, in response to failure of transmission of the first synchronization information, wherein
    performing the retransmitting in the first manner comprises: retransmitting the first synchronization information to the slave device; and
    performing the retransmitting in the second manner comprises:
        proceeding to obtaining the start time t1 of the K1th synchronization pulse and the start time t2 of the K2th connection event of the slave device and obtaining the offset time according to the start time t1 of the K1th synchronization pulse and the start time t2 of the K2th connection event, to obtain an updated count value K1 of the synchronization pulse and an updated offset time; and
        transmitting second synchronization information to the slave device in the upcoming connection event, wherein the second synchronization information carries the pulse period T1, an updated count value K1 of the synchronization pulse, and an updated offset time, wherein the method further comprises:
            after performing the retransmitting in the second manner, proceeding to performing the retransmitting in the second manner, in response to failure of transmission of the second synchronization information.

7. The method of claim 1, further comprising:
    after transmitting the first synchronization information to the slave device,
        disconnecting the connection between the master device and the slave device, upon detecting that the first synchronization information is successfully received by the slave device.

8. The method of claim 7, further comprising:
    after disconnecting the connection between the master device and the slave device,
    starting a resynchronization process regularly; wherein starting the resynchronization process comprises:
        transmitting preset synchronization information based on a channel pre-agreed with the slave device and by taking the pulse period T1 of the synchronization pulse as a transmission period, wherein the preset synchronization information transmitted each time carries a current count value of the synchronization pulse, wherein the channel pre-agreed with the slave device is a broadcast channel, and the preset synchronization information further carries the pulse period T1 of the synchronization pulse; and
        the resynchronization process lasts for a preset duration after each starting.

9. The method of claim 1, wherein initiating the synchronization pulse according to the pulse period T1 preset comprises:
    initiating the synchronization pulse according to the pulse period T1 preset and a local clock of the master device, wherein
    the start time t1 of the K1th synchronization pulse and the start time t2 of the K2th connection event are both by taken the local clock as a reference time.

10. A method for establishing synchronization relationship, the method being applicable to a slave device and comprising:
    obtaining a start time t2-local of a (K2-local)-th connection event, in response to first synchronization information sent by a master device being received in the (K2-local)-th connection event, wherein the first synchronization information carries a count value K1 of a K1th synchronization pulse of the master device, a count value K2 of a K2th connection event, and a pulse period of a synchronization pulse of the master device;
    obtaining an offset time according to a start time t1 of the K1th synchronization pulse and a start time t2 of the K2th connection event;
    setting a pulse period of a local synchronization pulse of the slave device to the pulse period of the synchronization pulse carried in the first synchronization information;
    setting a start time t1-local of the local synchronization pulse of the slave device and a count value K1-local at start of the local synchronization pulse according to at least the start time t2-local, a count value K2-local, the count value K2, the count value K1, the offset time, and a connection event period of the slave device; wherein the start time t1-local of the local synchronization pulse is later than a current time of the slave device; and
    initiating the local synchronization pulse according to the start time t1-local of the local synchronization pulse, the pulse period of the local synchronization pulse, and the count value K1-local at the start of the local synchronization pulse.

11. The method of claim 10, wherein setting the start time t1-local of the local synchronization pulse of the slave device and the count value K1-local at the start of the local synchronization pulse according to at least of the start time t2-local, the K2-local, the count value K2, the count value K1, the offset time, and the connection event period of the slave device comprises:

setting the start time t1-local of the local synchronization pulse to t1-local=t2-local−(K2-local−K2)*T0+offset, and setting the count value K1-local at the start of the local synchronization pulse to K1-local=K1; wherein T0 is the connection event period of the slave device; and in response to the start time t1-local being earlier than the current time of the slave device, updating the start time t1-local to t1-local=t1-local+n2*T1, and updating the count value K1-local to K1-local=K1-local+n2; wherein T1 represents the pulse period of the synchronization pulse, and n2 is a positive integer to make an updated start time t1-local later than the current time of the slave device.

12. The method of claim 11, wherein n2 is a minimum positive integer to make the updated start time t1-local later than the current time of the slave device.

13. The method of claim 11, further comprising:

after setting the start time t1-local of the local synchronization pulse to t1-local=t2-local−(K2-local−K2)*T0+offset, and setting the count value K1-local at the start of the local synchronization pulse to K1-local=K1, in response to the start time t1-local being later than the current time of the slave device and K2−K2-local being greater than or equal to 2, updating the start time t1-local to t1-local=t1-local−n3*T1, and updating the count value K1-local to K1-local=K1-local−n3; wherein n3 is a maximum positive integer to make the start time t1-local later than a start time (t2-local+T0) of a (K2-local+1)-th connection event.

14. The method of claim 10, further comprising:

prior to initiating the local synchronization pulse according to the start time t1-local of the local synchronization pulse, the pulse period of the local synchronization pulse, and the count value K1-local at the start of the local synchronization pulse, obtaining the start time t2-local of the (K2-local)-th connection event in response to second synchronization information sent by the master device being received in the (K2-local)-th connection event; wherein the second synchronization information carries the count value K1 of the K1th synchronization pulse of the master device, the offset time, and the pulse period of the synchronization pulse, and the offset time is a difference recorded by the master terminal between the start time t1 of the K1th synchronization pulse and the start time t2 of the K2th connection event, and the start time t1 is later than the start time t2;

setting the pulse period of the local synchronization pulse of the slave device to the pulse period carried in the second synchronization information; and setting the start time t1-local of the local synchronization pulse to t1-local=t2-local+offset, and setting the count value K1-local at the start of the local synchronization pulse to K1-local=K1.

15. The method of claim 14, further comprising:

after receiving the first synchronization information or the second synchronization information,
disconnecting a connection between the slave device and the master device; and wherein the method further comprises:

after disconnecting the connection between the master device and the slave device, starting a resynchronization process regularly; wherein starting the resynchronization process comprises:

setting a time window for resynchronization according to a start time of the local synchronization pulse set last time, the pulse period, a current time of the slave device, and a pre-acquired frequency deviation between the slave device and the master device;

waiting to receive third synchronization information sent by the master device in the time window on a channel pre-agreed with the master device; wherein a transmission period of the third synchronization information is the same as the pulse period of the synchronization pulse of the master device, and the third synchronization information carries a current count value of the synchronization pulse, wherein the channel pre-agreed with the master device is a broadcast channel;

obtaining a time at which the third synchronization information is received, in response to the third synchronization information being received in the time window;

updating the start time t1-local of the local synchronization pulse to the time at which the third synchronization information is received, updating the count value K1-local at the start of the local synchronization pulse to the current count value of the synchronization pulse carried in the third synchronization information, and updating the pulse period of the local synchronization pulse to the pulse period of the synchronization pulse carried in the third synchronization information in response to the pulse period of the synchronization pulse being carried in the third synchronization information; and re-initiating the local synchronization pulse according to the start time t1-local of the local synchronization pulse, the pulse period of the local synchronization pulse, and the count value K1-local at the start of the local synchronization pulse.

16. The method of claim 15, wherein obtaining the time at which the third synchronization information is received in response to the third synchronization information being received in the time window comprises:

verifying the third synchronization information, allowing the third synchronization information to be received in response to verification of the third synchronization information being passed, and recording a time at which the verification of the third synchronization information is passed; and obtaining the time at which the third synchronization information is received according to the time at which the verification of the third synchronization information is passed and a verification time length preset in the slave device.

17. The method of claim 15, wherein setting the time window for the resynchronization according to the start time of the local synchronization pulse set last time, the pulse period, the current time of the slave device, and the pre-acquired frequency deviation between the slave device and the master device comprises:

determining a length L of the time window as: L=(t0−t1-local)*PPM/1000000; and determining a time center point ta of the time window as: ta=t1-local+n4*T1; wherein PPM represents the frequency deviation, t1-local represents the start time of the local synchronization pulse, and n4 is an integer to make the time center point ta later than a current time t0 of the slave device.

18. The method of claim 10, further comprising:

after initiating the local synchronization pulse according to the start time t1-local of the local synchronization pulse, the pulse period of the local synchronization pulse, and the count value K1-local at the start of the local synchronization pulse, performing data collection based on the local synchronization pulse to obtain data packets, and renumbering the data packets; wherein data collected in each pulse period of the local synchronization pulse forms a data packet, and a number of each data packet is a corresponding count value of the local synchronization pulse during the data collection; and transmitting numbered data packets to the master device sequentially.

19. A chip, comprising: a processing part and a storing part, wherein the storing part is configured to store an instruction executable by the processing part; and the instruction, when executed by the processing part, causes the processing part to perform:

in response to the chip serving as a master device, a method for establishing synchronization relationship comprising:

initiating a synchronization pulse of the master device according to a pulse period preset; and transmitting synchronization information according to a channel pre-agreed with a slave device and by taking the pulse period as a transmission period, whereby the slave device initiates a local synchronization pulse synchronized with the synchronization pulse of the master device according to the synchronization information; wherein the synchronization information transmitted each time carries a current count value of the synchronization pulse; and in response to the chip serving as a slave device, a method for establishing synchronization relationship comprising:

receiving synchronization information periodically transmitted by the master device on a channel pre-agreed with the master device, and obtaining a time at which the synchronization information is received; wherein a transmission period of the synchronization information is the same as a pulse period of a synchronization pulse of the master device, and the synchronization information carries a current count value of the synchronization pulse;

setting a start time of a local synchronization pulse of the slave device to the time at which the synchronization information is received, setting a count value at start of the local synchronization pulse to the current count value carried in the synchronization information, and setting a pulse period of the local synchronization pulse to the pulse period of the synchronization pulse carried in the synchronization information or the transmission period of the synchronization information; and initiating the local synchronization pulse according to the start time of the local synchronization pulse, the pulse period of the local synchronization pulse, and the count value at the start of the local synchronization pulse.

20. The chip of claim 19, wherein the channel pre-agreed with the slave device is the same as the channel pre-agreed with the master device, and the channel pre-agreed with the slave device is a broadcast channel; wherein after initiating the local synchronization pulse according to the start time of the local synchronization pulse, the pulse period of the local synchronization pulse, and the count value at the start of the local synchronization pulse, the instruction, when executed by the processing part, further causes the processing part to perform:

performing data collection based on the local synchronization pulse to obtain data packets, and renumbering the data packets; wherein data collected in each pulse period of the local synchronization pulse forms a data packet, and a number of each data packet is a corresponding count value of the local synchronization pulse during the data collection; and transmitting numbered data packets to the master device sequentially.

* * * * *